(12) United States Patent
Horn et al.

(10) Patent No.: US 12,534,078 B2
(45) Date of Patent: Jan. 27, 2026

(54) WHEELED VEHICLE ADAPTIVE SPEED CONTROL METHOD AND SYSTEM

(71) Applicant: INDIAN MOTORCYCLE INTERNATIONAL, LLC, Medina, MN (US)

(72) Inventors: Jacob R. Horn, North Branch, MN (US); Marcus A. Wetterlund, Forest Lake, MN (US)

(73) Assignee: INDIAN MOTORCYCLE INTERNATIONAL, LLC, Medina, MN (US)

( * ) Notice: Subject to any disclaimer, the term of this patent is extended or adjusted under 35 U.S.C. 154(b) by 973 days.

(21) Appl. No.: 17/269,789

(22) PCT Filed: Aug. 19, 2019

(86) PCT No.: PCT/US2019/047046
§ 371 (c)(1),
(2) Date: Feb. 19, 2021

(87) PCT Pub. No.: WO2020/041188
PCT Pub. Date: Feb. 27, 2020

(65) Prior Publication Data
US 2021/0197816 A1 Jul. 1, 2021

Related U.S. Application Data

(60) Provisional application No. 62/765,321, filed on Aug. 20, 2018.

(51) Int. Cl.
*B60W 30/16* (2020.01)
*B62J 45/415* (2020.01)
(Continued)

(52) U.S. Cl.
CPC .......... *B60W 30/16* (2013.01); *B62J 45/4151* (2020.02); *B62J 45/42* (2020.02);
(Continued)

(58) Field of Classification Search
CPC .......... B60W 30/16; B60W 2300/367; B60W 2420/52; B60W 2520/18;
(Continued)

(56) References Cited

U.S. PATENT DOCUMENTS 5,680,123 A 10/1997 Lee
5,929,786 A 7/1999 Schofield et al.
(Continued)

FOREIGN PATENT DOCUMENTS

CA 2120638 A1 10/1995
CN 106043302 A 10/2016
(Continued)

OTHER PUBLICATIONS

Japanese Office Action corresponding to JP2021-509968 dated Oct. 11, 2022 (with English translation).
(Continued)

*Primary Examiner* — Tyler J Lee
(74) *Attorney, Agent, or Firm* — SCHWEGMAN LUNDBERG & WOESSNER, P.A.

(57) ABSTRACT

Disclosed is a vehicle. The vehicle generally includes a frame to support an engine and one or more supports, such as wheels, to support the frame. The engine may include an internal combustion power plant and a fuel supply system therefore.

29 Claims, 20 Drawing Sheets

(51) Int. Cl.
*B62J 45/42* (2020.01)
*B62J 50/22* (2020.01)
*B62J 50/25* (2020.01)
*B62K 11/04* (2006.01)
*G01S 13/931* (2020.01)

(52) U.S. Cl.
CPC .............. *B62J 50/22* (2020.02); *B62J 50/25* (2020.02); *B62K 11/04* (2013.01); *B60W 2300/367* (2013.01); *B60W 2420/408* (2024.01); *B60W 2520/18* (2013.01); *G01S 2013/9325* (2013.01)

(58) Field of Classification Search
CPC ..... B60W 2554/801; B60W 2554/802; B60W 2050/146; B60W 2300/36; B62J 50/25; B62J 45/42; B62J 50/22; B62J 45/4151; B62J 45/20; B62J 45/41; B62K 11/04; B60K 2031/0016; B60K 2031/0025; B60K 31/0008; G01S 2013/9325; B62M 7/02
See application file for complete search history.

(56) References Cited

U.S. PATENT DOCUMENTS

| | | | |
|---|---|---|---|
| 6,198,409 | B1 | 3/2001 | Schofield et al. |
| 6,291,906 | B1 | 9/2001 | Marcus et al. |
| 6,727,844 | B1 | 4/2004 | Zimmermann et al. |
| 6,838,981 | B2 | 1/2005 | Zoratti |
| 6,842,684 | B1 | 1/2005 | Kade et al. |
| 6,856,906 | B2 | 2/2005 | Winner et al. |
| 6,877,888 | B2 | 4/2005 | DeLine et al. |
| 6,922,292 | B2 | 7/2005 | Bos |
| 7,159,679 | B2 | 1/2007 | Sena |
| 7,198,512 | B1 | 4/2007 | Swiatek |
| 7,266,219 | B2 | 9/2007 | Okamoto et al. |
| 7,353,086 | B2 | 4/2008 | Ennis |
| 7,360,931 | B2 | 4/2008 | Haag |
| 7,379,813 | B2 | 5/2008 | Kubota et al. |
| 7,427,150 | B2 | 9/2008 | Carter et al. |
| 7,432,800 | B2 | 10/2008 | Harter, Jr. et al. |
| 7,511,607 | B2 | 3/2009 | Hubbard et al. |
| 7,634,341 | B2 | 12/2009 | Patchell |
| 7,729,856 | B2 | 6/2010 | Danz |
| 7,880,596 | B2 | 2/2011 | Lynam et al. |
| 8,044,780 | B2 | 10/2011 | Tseng et al. |
| 8,072,351 | B1 | 12/2011 | Absher, II |
| 8,080,922 | B2 | 12/2011 | Reiche |
| 8,083,386 | B2 | 12/2011 | Lynam |
| 8,138,899 | B2 | 3/2012 | Ghneim |
| 8,270,536 | B2 | 9/2012 | Reiche |
| 8,274,729 | B2 | 9/2012 | Luten et al. |
| 8,282,253 | B2 | 10/2012 | Lynam |
| 8,363,103 | B2 | 1/2013 | Ichinose et al. |
| 8,493,195 | B2 | 7/2013 | Lee |
| 8,508,350 | B2 | 8/2013 | Nix et al. |
| 8,511,164 | B2 | 8/2013 | Klee et al. |
| 8,525,654 | B2 | 9/2013 | Yoshizawa et al. |
| 8,534,887 | B2 | 9/2013 | DeLine et al. |
| 8,564,425 | B2 | 10/2013 | Al-Jafar |
| 8,624,977 | B2 | 1/2014 | Satoh |
| 8,643,482 | B2 | 2/2014 | Yamazaki |
| 8,886,023 | B2 | 11/2014 | Satoh |
| 9,153,133 | B1 | 10/2015 | Lunsford |
| 9,204,108 | B2 | 12/2015 | Satoh et al. |
| 9,247,779 | B1 | 2/2016 | Aloumanis et al. |
| 9,262,923 | B2 | 2/2016 | Chang et al. |
| 9,436,880 | B2 | 9/2016 | Bos et al. |
| 9,445,639 | B1 | 9/2016 | Aloumanis et al. |
| 9,487,139 | B1 | 11/2016 | Ishida et al. |
| 9,699,421 | B2 | 7/2017 | Ono et al. |
| 10,029,683 | B1 | 7/2018 | Ginther et al. |
| 10,219,571 | B1 | 3/2019 | Aloumanis et al. |
| 10,222,802 | B2 | 3/2019 | Kuttenberger |
| 10,309,791 | B2 | 6/2019 | Rajab et al. |
| 10,387,735 | B2 | 8/2019 | Frenzel et al. |
| 10,429,501 | B2 | 10/2019 | Pineda-Deom |
| 10,455,882 | B2 | 10/2019 | Strickland |
| 10,994,744 | B2 | 5/2021 | Kanoh et al. |
| 2004/0030499 | A1 | 2/2004 | Knoop et al. |
| 2004/0143373 | A1 | 7/2004 | Ennis |
| 2004/0145904 | A1 | 7/2004 | DeLine et al. |
| 2006/0006988 | A1 | 1/2006 | Harter et al. |
| 2006/0078162 | A1 | 4/2006 | Wonneberger |
| 2006/0103727 | A1 | 5/2006 | Tseng |
| 2007/0177014 | A1 | 8/2007 | Frenzel et al. |
| 2008/0106459 | A1 | 5/2008 | Jordan |
| 2008/0128190 | A1 | 6/2008 | Tsutsumi et al. |
| 2008/0167781 | A1 | 7/2008 | Labuhn et al. |
| 2008/0234907 | A1 | 9/2008 | Labuhn et al. |
| 2009/0199815 | A1* | 8/2009 | Fukami ............... B60L 3/10 123/399 |
| 2010/0238014 | A1 | 9/2010 | Lynam et al. |
| 2011/0002028 | A1 | 1/2011 | Luten et al. |
| 2011/0017570 | A1 | 1/2011 | Graf |
| 2011/0018170 | A1 | 1/2011 | Ueno et al. |
| 2011/0175755 | A1 | 7/2011 | Yoshioka et al. |
| 2011/0181728 | A1 | 7/2011 | Tieman et al. |
| 2012/0008120 | A1 | 1/2012 | Matsui et al. |
| 2012/0027140 | A1 | 2/2012 | Weng et al. |
| 2012/0056738 | A1 | 3/2012 | Lynam |
| 2012/0081233 | A1 | 4/2012 | Niel |
| 2012/0119894 | A1 | 5/2012 | Pandy |
| 2012/0271484 | A1 | 10/2012 | Feit et al. |
| 2013/0017610 | A1 | 1/2013 | Roberts et al. |
| 2013/0024210 | A1 | 1/2013 | Bessette |
| 2013/0029370 | A1 | 1/2013 | Coelho |
| 2013/0031100 | A1 | 1/2013 | Graham et al. |
| 2013/0176145 | A1 | 7/2013 | Yu |
| 2013/0242103 | A1 | 9/2013 | Schraga |
| 2013/0293712 | A1 | 11/2013 | Turner et al. |
| 2013/0311071 | A1 | 11/2013 | Schnorbus et al. |
| 2013/0311075 | A1 | 11/2013 | Tran et al. |
| 2014/0015976 | A1 | 1/2014 | DeLine et al. |
| 2014/0019005 | A1 | 1/2014 | Lee et al. |
| 2014/0081566 | A1 | 3/2014 | Kuwabara |
| 2014/0151850 | A1 | 6/2014 | Basker et al. |
| 2014/0330479 | A1 | 11/2014 | Dolgov et al. |
| 2015/0004280 | A1 | 1/2015 | Longo et al. |
| 2015/0015630 | A1 | 1/2015 | Ozawa |
| 2015/0042807 | A1 | 2/2015 | Ihlenburg et al. |
| 2015/0124060 | A1 | 5/2015 | Hasegawa et al. |
| 2015/0156383 | A1 | 6/2015 | Biemer et al. |
| 2015/0165971 | A1 | 6/2015 | Grundmann |
| 2015/0228066 | A1 | 8/2015 | Farb |
| 2016/0014800 | A1 | 1/2016 | Falconetti et al. |
| 2016/0016630 | A1* | 1/2016 | Thompson ............... B62M 6/45 74/519 |
| 2016/0090037 | A1 | 3/2016 | Tetsuka et al. |
| 2016/0148062 | A1 | 5/2016 | Fursich |
| 2016/0148081 | A1 | 5/2016 | Fukuda |
| 2016/0229341 | A1 | 8/2016 | Singhal |
| 2017/0122757 | A1 | 5/2017 | Rajab et al. |
| 2017/0144665 | A1 | 5/2017 | Ohashi et al. |
| 2017/0151850 | A1 | 6/2017 | Deigmoller et al. |
| 2017/0206789 | A1 | 7/2017 | Shimizu et al. |
| 2017/0327177 | A1 | 11/2017 | Mizuno et al. |
| 2018/0227729 | A1 | 8/2018 | Bai et al. |
| 2019/0248367 | A1 | 8/2019 | Knitt |
| 2019/0272432 | A1 | 9/2019 | Seko |
| 2020/0047755 | A1 | 2/2020 | Dorenkamp et al. |
| 2020/0062254 | A1 | 2/2020 | Grelaud et al. |
| 2020/0108830 | A1* | 4/2020 | Grelaud ............... B60W 10/184 |
| 2020/0124430 | A1 | 4/2020 | Bradlow et al. |
| 2020/0132824 | A1 | 4/2020 | Pfau et al. |
| 2020/0180661 | A1 | 6/2020 | Honda et al. |
| 2020/0231170 | A1 | 7/2020 | Grelaud et al. |
| 2021/0065467 | A1 | 3/2021 | Allinger et al. |
| 2021/0166558 | A1 | 6/2021 | Giraud et al. |

(56) References Cited

U.S. PATENT DOCUMENTS

| | | | |
|---|---|---|---|
| 2022/0169273 | A1 | 6/2022 | Horn et al. |
| 2025/0091579 | A1 | 3/2025 | Horn |

FOREIGN PATENT DOCUMENTS

| | | |
|---|---|---|
| CN | 106573620 A | 4/2017 |
| CN | 106696854 A | 5/2017 |
| DE | 102007053274 A1 | 5/2009 |
| DE | 102012016108 A1 | 1/2014 |
| DE | 102013218458 A1 | 3/2015 |
| DE | 102013220781 A1 | 4/2015 |
| DE | 102014213392 A1 | 1/2016 |
| DE | 102017204436 A1 | 9/2018 |
| EP | 0899157 B1 | 10/2004 |
| EP | 1615048 A1 | 1/2006 |
| EP | 1630756 A1 | 3/2006 |
| EP | 1647447 A2 | 4/2006 |
| EP | 1562053 A3 | 10/2006 |
| EP | 1470957 A3 | 1/2007 |
| EP | 1902338 A2 | 3/2008 |
| EP | 1630756 B1 | 7/2008 |
| EP | 1803625 B1 | 11/2009 |
| EP | 2151350 A1 | 2/2010 |
| EP | 1478546 B1 | 7/2011 |
| EP | 2487505 B1 | 4/2013 |
| EP | 2208086 B1 | 5/2013 |
| EP | 2168815 B1 | 6/2014 |
| EP | 3050752 A1 | 8/2016 |
| EP | 3335955 A1 | 6/2018 |
| GB | 2311265 B | 9/2000 |
| GB | 2446845 A | 8/2008 |
| GB | 2539759 A | 12/2016 |
| IN | 201004045 | 12/2020 |
| JP | 2000057496 A | 2/2000 |
| JP | 2001105973 A | 4/2001 |
| JP | 2001151015 A | 6/2001 |
| JP | 2006131213 A | 5/2006 |
| JP | 2007137186 A | 6/2007 |
| JP | 2008077631 A | 4/2008 |
| JP | 2008100596 A | 5/2008 |
| JP | 4233182 B2 | 3/2009 |
| JP | 2009116882 A | 5/2009 |
| JP | 2009154713 A | 7/2009 |
| JP | 2009204592 A | 9/2009 |
| JP | 4731392 B2 | 7/2011 |
| JP | 4855884 B2 | 1/2012 |
| JP | 4877447 B2 | 2/2012 |
| JP | 5118605 B2 | 1/2013 |
| JP | 5134504 B2 | 1/2013 |
| JP | 201634819 A | 3/2016 |
| JP | 201668606 A | 5/2016 |
| JP | 2017039487 A | 2/2017 |
| JP | 201791138 A | 5/2017 |
| JP | 2017126242 A | 7/2017 |
| JP | 2017218133 A | 12/2017 |
| JP | 2018118716 A | 8/2018 |
| TW | 200743606 A | 12/2007 |
| WO | 03047900 A1 | 6/2003 |
| WO | WO-2008058777 A1 | 5/2008 |
| WO | 2013036762 A1 | 3/2013 |
| WO | 2013131671 A1 | 9/2013 |
| WO | 2013170979 A1 | 11/2013 |
| WO | 2017030131 A1 | 2/2017 |
| WO | WO-2017030132 A1 | 2/2017 |
| WO | 2017125190 A1 | 7/2017 |
| WO | 2018025231 A1 | 2/2018 |
| WO | 2018108436 A1 | 6/2018 |
| WO | 2019/111139 A1 | 6/2019 |
| WO | 2019111140 A1 | 6/2019 |
| WO | 2019186799 A1 | 10/2019 |
| WO | 2019186945 A1 | 10/2019 |
| WO | 2019235395 A1 | 12/2019 |
| WO | WO-2020041188 A1 | 2/2020 |
| WO | WO-2020041191 A1 | 2/2020 |

OTHER PUBLICATIONS

2nd Chinese Office Action regarding Patent Application No. 2019800547245, dated Dec. 12, 2022.
Chinese Office Action regarding Patent Application No. 2019800692395, dated Jun. 10, 2022.
International Search Report and Written Opinion mailed on Dec. 19, 2019 in corresponding application No. PCT/US2019/047052.
European Office Action regarding Patent Application No. 19759872.5, dated Mar. 17, 2023.
Chinese Office Action regarding Patent Application No. 2019800547245, dated Jun. 23, 2022.
Japanese Office Action for JP application No. 2021509968 dated Feb. 22, 2022.
Japanese Office Action regarding Patent Application No. 2021510111, dated Jul. 5, 2022.
Decision of Rejection regarding Chinese Patent Application No. 2019800692395, dated Sep. 23, 2022 (with English translation).
U.S. National Phase Application based on PCT/US2019/047052, Feb. 19, 2021, Horn, Jacob R., et al.
International Search Report and Written Opinion mailed on Oct. 30, 2019 in corresponding PCT application No. PCT/US2019/047046.
International Search Report and Written Opinion mailed on Oct. 30, 2019 in corresponding application No. PCT/US2019/047046.
International Preliminary Report on Patentability, issued in PCT/US2019/047046, dated Nov. 3, 2020; ISA/EP.
Restriction Requirement and Fees Due mailed on Nov. 4, 2019 in corresponding PCT application No. PCT/US2019/047052.
Written Opinion of the International Preliminary Examining Authority issued Aug. 12, 2020 is corresponding PCT Application PCT/US2019/047046.
Japanese Office Action for JP application No. 2023-093780 dated Apr. 2, 2024.
Japanese Office Action from the Japan Patent Office for related Japanese Patent Application No. 2023-101559 dated May 7, 2024, 9 pages.
Japanese Office Action from the Japan Patent Office for related Japanese Patent Application No. 2023-093780 dated Oct. 15, 2024, 3 pages.
"U.S. Appl. No. 17/269,827, 312 Amendment filed Apr. 14, 2025", 3 pgs.
"U.S. Appl. No. 17/269,827, Advisory Action mailed May 28, 2024", 3 pgs.
"U.S. Appl. No. 17/269,827, Corrected Notice of Allowability mailed Jan. 31 2025", 2 pgs.
"U.S. Appl. No. 17/269,827, Examiner Interview Summary mailed May 16, 2024", 2 pgs.
"U.S. Appl. No. 17/269,827, Examiner Interview Summary mailed Dec. 14, 2023", 3 pgs.
"U.S. Appl. No. 17/269,827, Final Office Action mailed Mar. 6, 2024", 41 pgs.
"U.S. Appl. No. 17/269,827, Non Final Office Action mailed Aug. 16, 2024", 30 pgs.
"U.S. Appl. No. 17/269,827, Non Final Office Action mailed Sep. 22, 2023", 36 pgs.
"U.S. Appl. No. 17/269,827, Notice of Allowance mailed Jan. 23, 2025", 8 pgs.
"U.S. Appl. No. 17/269,827, Preliminary Amendment filed Feb. 19, 2021", 15 pgs.
"U.S. Appl. No. 17/269,827, PTO Response to Rule 312 Communication mailed Apr. 21, 2025", 2 pgs.
"U.S. Appl. No. 17/269,827, Response filed May 15, 2024 to Final Office Action mailed Mar. 6, 2024", 24 pgs.
"U.S. Appl. No. 17/269,827, Response filed Jun. 3, 2024 to Advisory Action mailed May 29, 2024", 2 pgs.
"U.S. Appl. No. 17/269,827, Response filed Nov. 18, 2024 to Non Final Office Action mailed Aug. 16, 2024", 21 pgs.
"U.S. Appl. No. 17/269,827, Response filed Dec. 22, 2023 to Non Final Ofice Action mailed Sep. 22, 2023", 23 pgs.
"Chinese Application Serial No. 201980054724.5, Office Action mailed Jun. 23, 2022", with English translaion, 24 pages.
"Chinese Application Serial No. 201980054724.5, Office Action mailed Dec. 12, 2022", with English translation, 9 pages.

(56) References Cited

OTHER PUBLICATIONS

"Chinese Application No. 201980069239.5, Decision of Rejection mailed Sep. 23, 2023", w/o English Translation, 8 pgs.

"Chinese Application Serial No. 201980069239.5, Office Action mailed Jun. 10, 2022", with English translation, 17 pages.

"European Application Serial No. 19759872.5, Communication Pursuant to Article 94(3) EPC mailed Mar. 17, 2023", 11 pgs.

"International Application Serial No. PCT/US2019/047046, Response to Written Opinion filed Jun. 22, 2020 to Write Opinion mailed Oct. 30, 2019", 24 pgs.

"International Application Serial No. PCT/US2019/047052, International Preliminary Report on Patentability mailed Feb. 12, 2021", 38 pgs.

"International Application Serial No. PCT/US2019/047052, Invitation to Pay Additional Fees mailed Nov. 4, 2019", 15 pgs.

"Japanese Application Serial No. 2021-509968, Notification of Reasons for Refusal mailed Feb. 22, 2022", with English translation, 12 pages.

"Japanese Application Serial No. 2021-51011, Notification of Reasons for Refusal mailed Jul. 5, 2022", with English translation, 11 pages.

"Japanese Application Serial No. 2023-093780, Decision of Rejection mailed Apr. 22, 2025", with English translation, 14 pages.

"Japanese Application Serial No. 2023-093780, Notification of Reasons for Refusal mailed Apr. 2, 2024", with English translation, 12 pages.

"Japanese Application Serial No. 2023-093780, Notification of Reasons for Refusal mailed Oct. 15, 2024", w/o English Translation, 5 pgs.

"Japanese Application Serial No. 2023-093780, Response filed Feb. 27, 2025 to Notification of Reasons for Refusal mailed Oct. 15, 2024", with English claims, 62 pages.

"Japanese Application Serial No. 2023-101559, Notification of Reasons for Refual mailed May 7, 2024", with English translation, 10 pages.

* cited by examiner

TABLE 2

| Pre-requisite | Feature | Priority | Tasks | | | | |
|---|---|---|---|---|---|---|---|
| | | | Left Light (millisecond flash) | Right Light (millisecond flash) | Central Seat Motor operation | Left Seat Motor Operation | Right Seat Motor Operation |
| | FCW (level 2 - High risk) | 1 | 300 ms Flashes | 300ms Flashes | On | Off | Off |
| Motorcycle Speed > 10mph | RATA (Level 2 - High risk) | 1 | 300ms Flashes | 300ms Flashes | Off | On | On |
| Motorcycle Speed < 10mph | RATA (Level 2 - High risk) | 1 | 300ms Flashes | 300ms Flashes | Off | On | On |
| | FCW (level 1 - Moderate risk) | 2 | On | On | Pulse at 750ms | Off | Off |
| Motorcycle Speed > 10mph | RATA (Level 1 - Moderate risk) | 2 | On | On | Off | Pulse at 750ms | Pulse at 750ms |
| Motorcycle Speed < 10mph | RATA (Level 1 - Moderate risk) | 2 | On | On | Off | Pulse at 750ms | Pulse at 750ms |
| | BSD/LCA - Left | 3 | On | Off | Off | Single 500ms pulse on change | Off |
| | BSD/LCA - Right | 3 | Off | On | Off | Off | Single 500ms pulse on change |

Key

FCW = Forward Notification
RATA = Rear Approaching Traffic Alert
BSD = Blind Spot Detection
LCA = Lane Change Assist

FIG. 9A

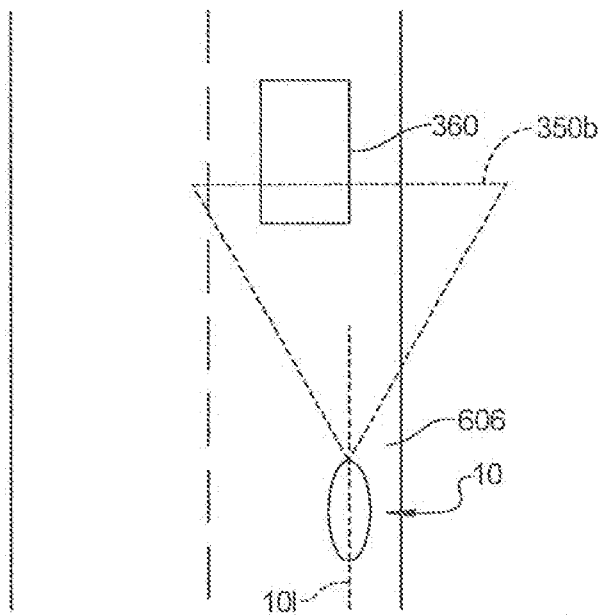
FIG. 12A
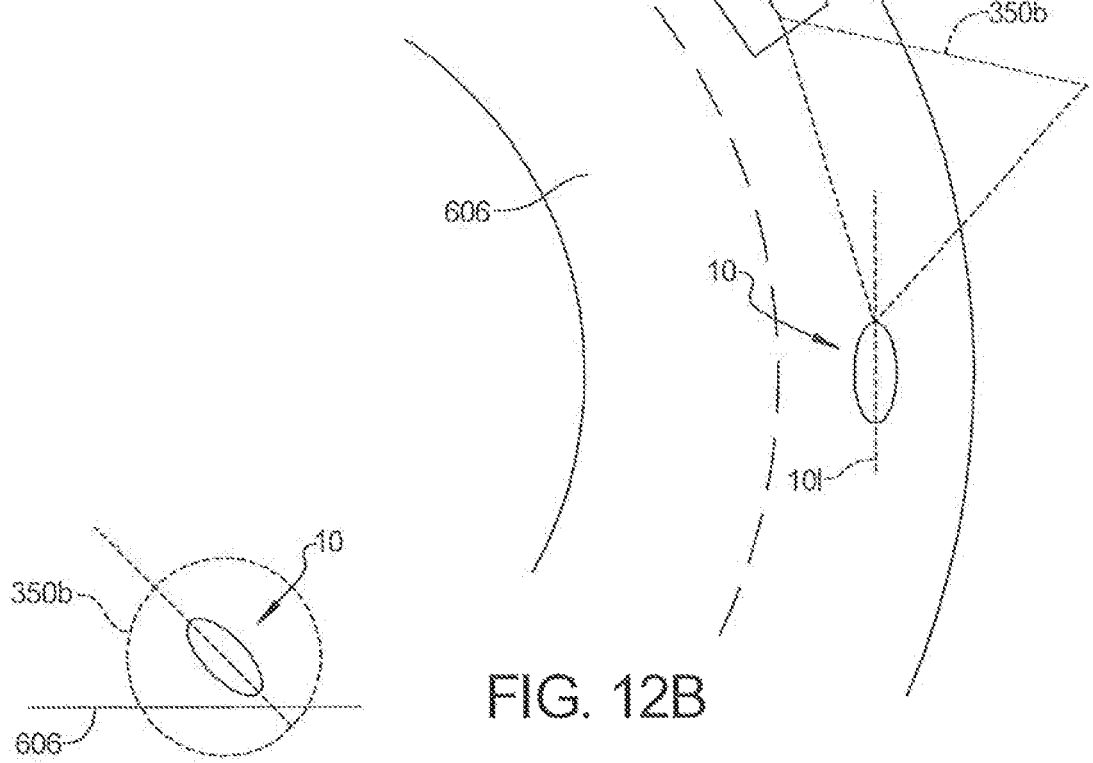
FIG. 12B
FIG. 12C

WHEELED VEHICLE ADAPTIVE SPEED CONTROL METHOD AND SYSTEM

CROSS REFERENCE TO RELATED APPLICATIONS

This application is a U.S. National Phase Application under 35 U.S.C. 371 of International Application No. PCT/US2019/047052, filed on Aug. 19, 2019 and published as WO 2020/041191 A1 on Feb. 27, 2020, which claims the benefit of U.S. Provisional Patent Application No. 62/765,322 filed on Aug. 20, 2018. This application also corresponds to International Application No. PCT/US2019/047046, filed on Aug. 19, 2019 and published as WO 2020/041188 A1 on Feb. 27, 2020, now U.S. application Ser. No. 17/269,789, filed Feb. 19, 2021. The entire disclosures of all of the above applications are incorporated herein by reference.

FIELD

The present disclosure relates to a vehicle, and particularly to a wheeled vehicle, especially a wheeled vehicle with less than four wheels, and operational components therefore.

BACKGROUND

This section provides background information related to the present disclosure which is not necessarily prior art.

A vehicle to move a payload, such as an operator or rider, includes a power plant, such as an engine. The vehicle may include various controls, such as a throttle and brake systems. The control systems are generally operated manually by the operator. The vehicle may include a two-wheeled vehicle that is generally substantially manually operated.

SUMMARY

This section provides a general summary of the disclosure, and is not a comprehensive disclosure of its full scope or all of its features.

Disclosed herein is a motorcycle assembly for operation by rider. The rider may operate the motorcycle to travel along an intended path on a surface. The surface may include a road surface which may be shared with other objects, such as other motorcycles or other vehicles such as 4 wheel vehicles.

In various embodiments the motorcycle 10 may include one or more sensors to sense an environment exterior to the motorcycle 10. For example various ranging assemblies such as radar assemblies, laser ranging (lidar) assemblies, or the like may be used to measure distances to exterior objects, speed or change in speed of exterior objects, positions of exterior objects, or the like. Based upon the sensed objects the various systems of the motorcycle may be automatically operated and/or changed to provide information to the rider, information to operators of the exterior vehicles, or the like.

The motorcycle may further include notification that may be provided to operators external to the motorcycle. For example visual notifications, such as flashing lights, may be provided to exterior vehicle operators. Auditory notifications may also be provided, such as from a motorcycle horn, speaker, etc. Various signals may also be sent to selected vehicles, such as with a generally available communication to a selected vehicle to alert a driver and/or autonomous driver system of the presence of the vehicle. The notifications may be provided based upon automatic determinations due to sensed positions, speeds, or the like of vehicles relative to the motorcycle.

Further the motorcycle may include a constant speed or cruise control. The cruise control may be operated automatically or with input from various sensors on the motorcycle. The sensors may operate to determine positions of the motorcycle relative to other vehicles, such as other motorcycles and/or other non-motorcycle vehicles. The cruise control may be operated substantially without further rider input to maintain a selected or predetermined distance between the motorcycle or other objects.

The two-wheeled vehicle, as disclosed herein, may provide automatic feedback and/or notifications to the rider and external operators regarding the presence of the two-wheeled vehicle and/or position and speed of external vehicles. The notifications may assist in providing awareness to the rider of the external vehicles and vice-versa. Further, sensor inputs may allow for automatic operation of various controls of the two-wheeled vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9A is a Table 2 including input criteria for a notification system;

Figure 11A:
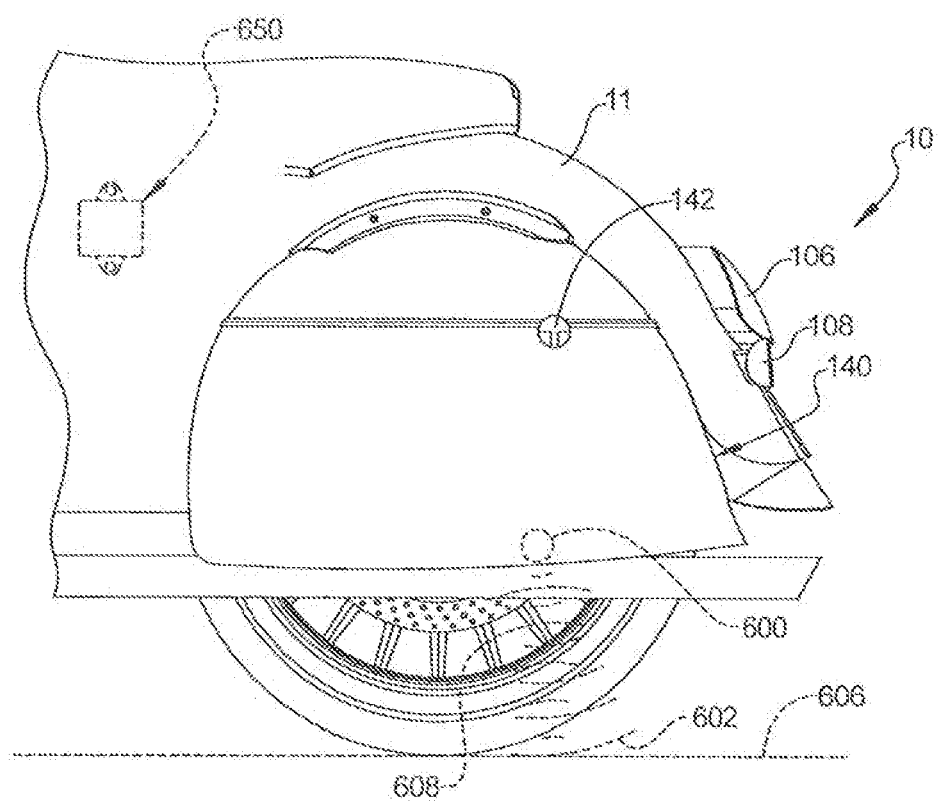
Figure 11B:
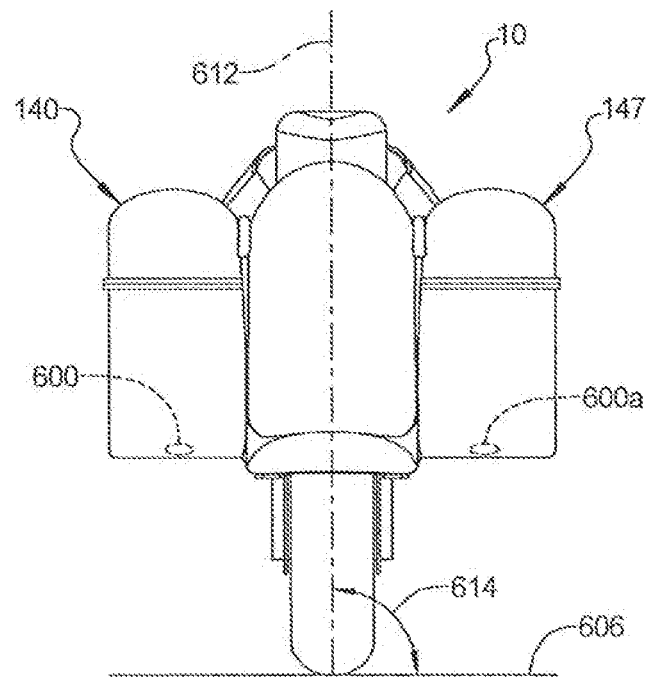
Figure 11C:
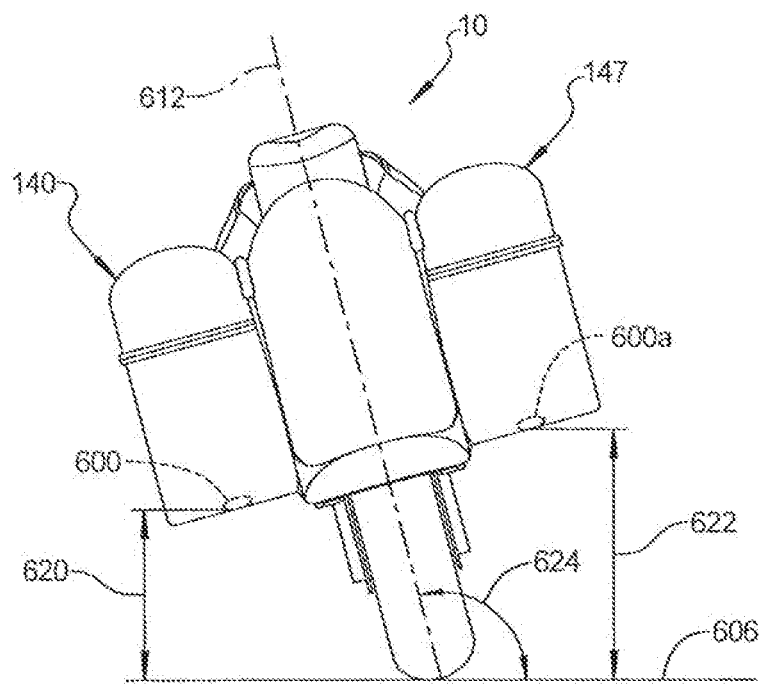
Figure 13:
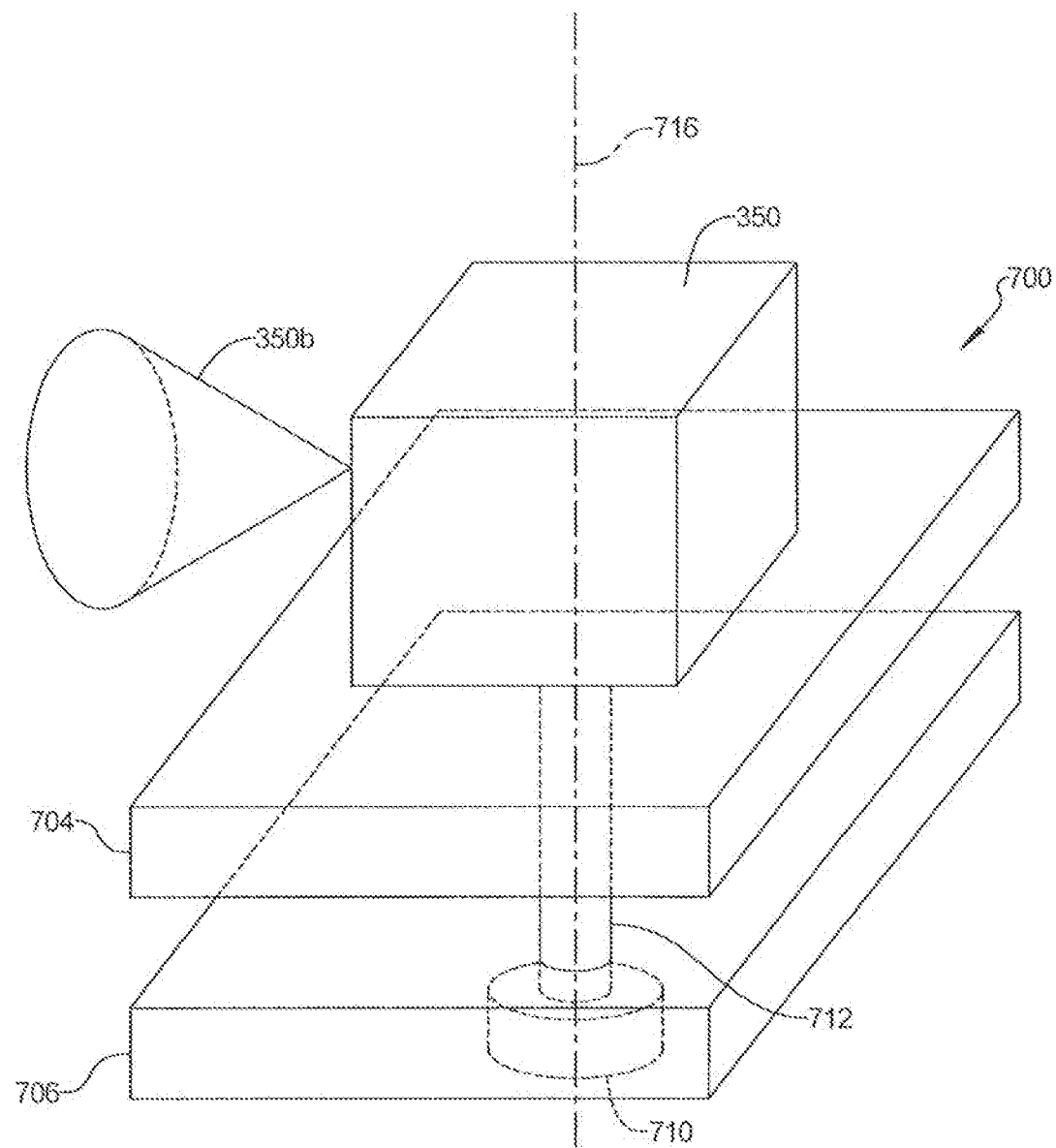
Figure 14:
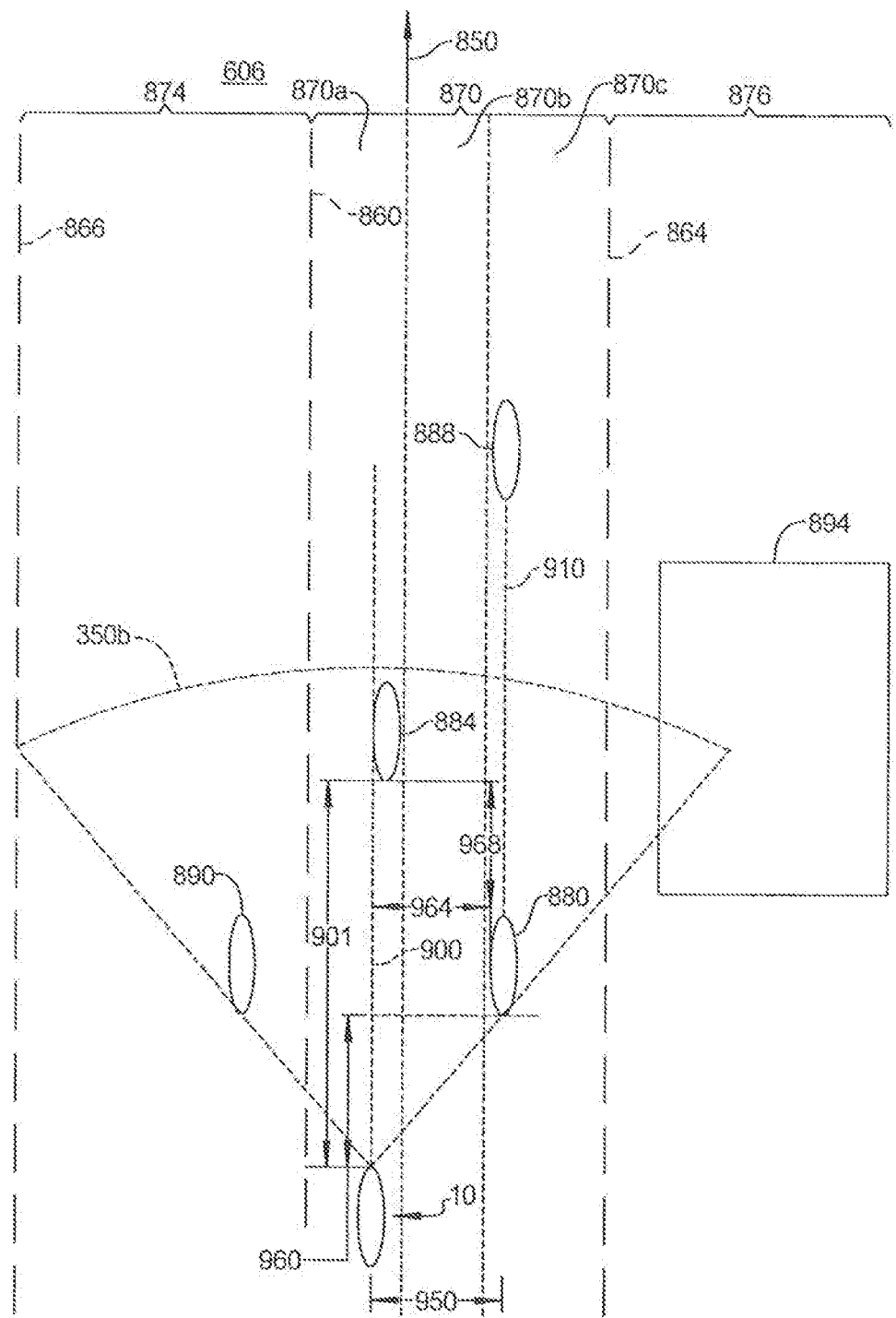
Figure 15:
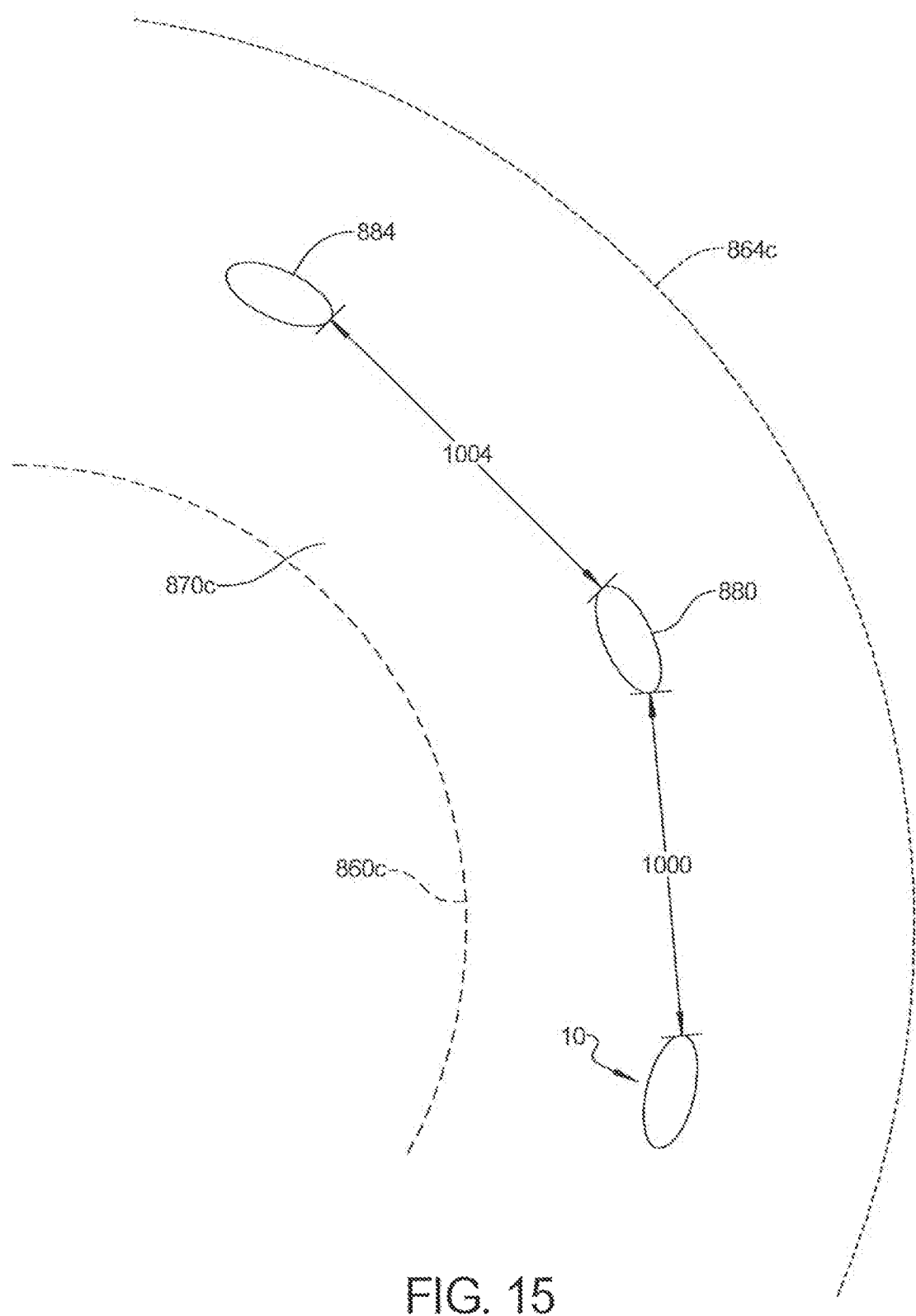
Figure 16A:
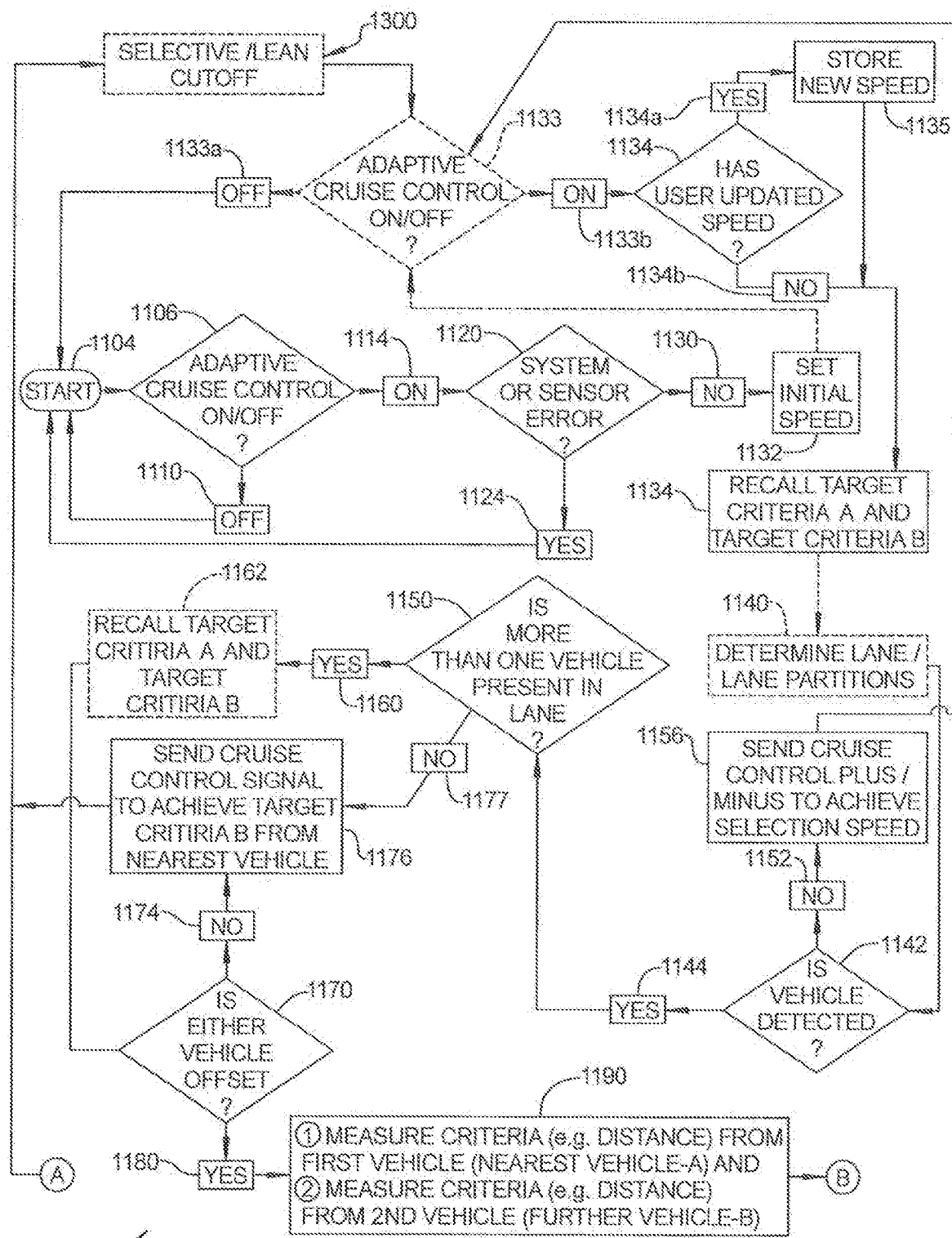
Figure 16B:
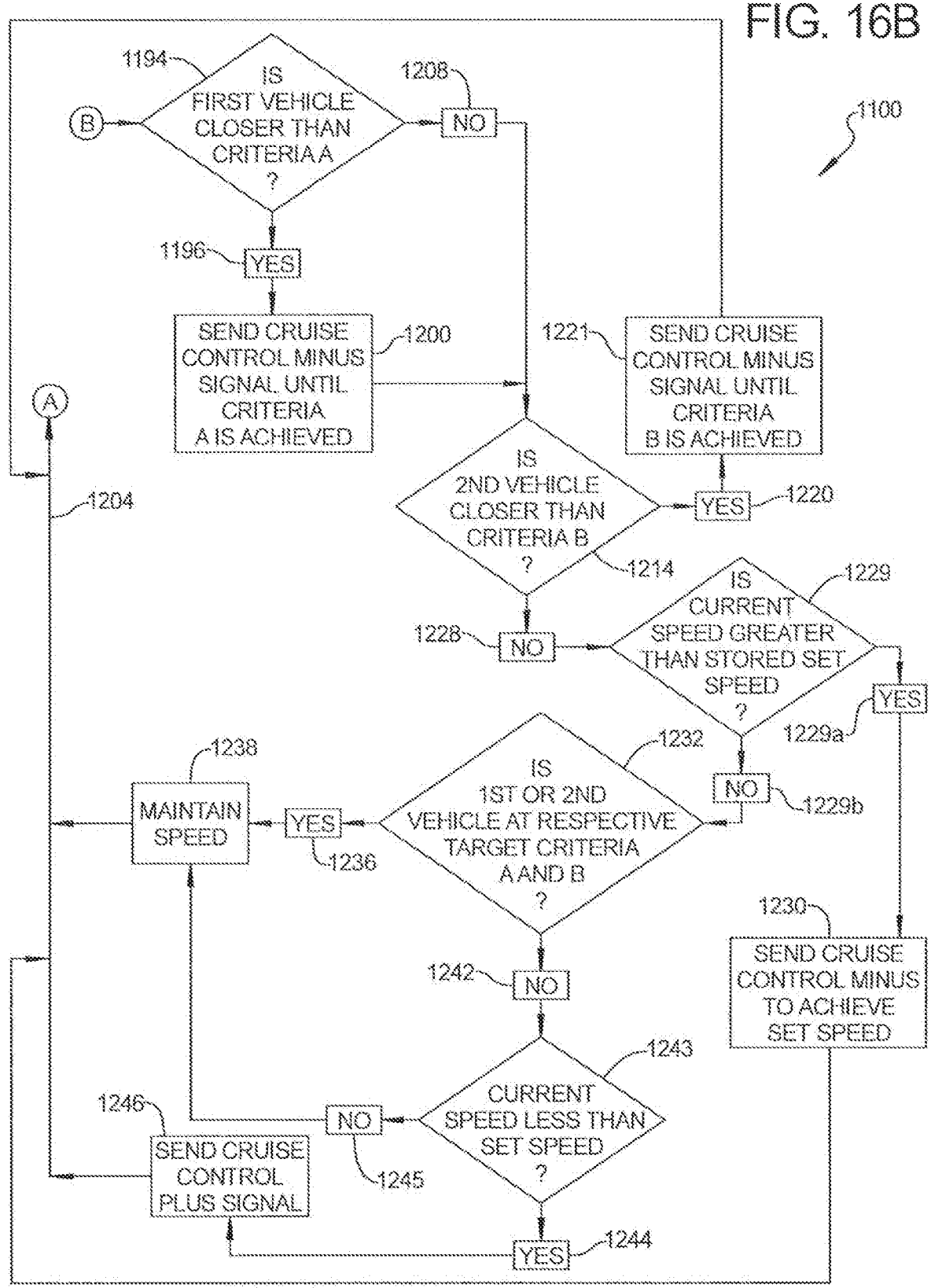
Figure 17:
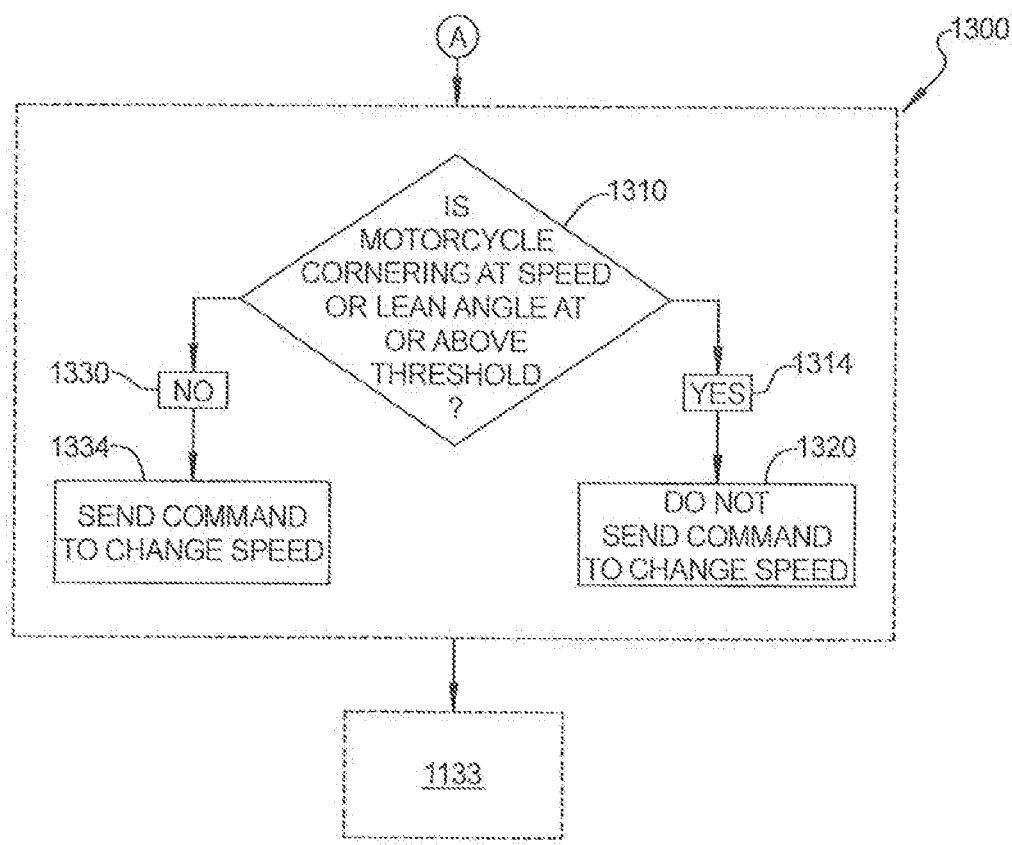

FIG. 11A, FIG. 11B, and FIG. 11C are partial view of a motorcycle with lean sensors;

FIG. 12A is a schematic illustration of a motorcycle following a vehicle on a straight path;

FIG. 12B is a top schematic illustration of a motorcycle following a vehicle on a curved path;

FIG. 12C is a side schematic illustration of a motorcycle following a vehicle on a curved path;

FIG. 13 is a schematic illustration of an actuation assembly for movement of a sensor assembly;

FIG. 14 is a plan schematic view of a motorcycle riding configuration on a straight path;

FIG. 15 is an illustration of a riding configuration of a plurality of motorcycles on a curved path;

FIG. 16A and FIG. 16B is a flowchart for operation of an adaptive cruise control;

FIG. 17 is a flowchart of an optional logical/method application of the adaptive cruise control.

Corresponding reference numerals indicate corresponding parts throughout the several views of the drawings.

DETAILED DESCRIPTION

Example embodiments will now be described more fully with reference to the accompanying drawings.

Figure 1:
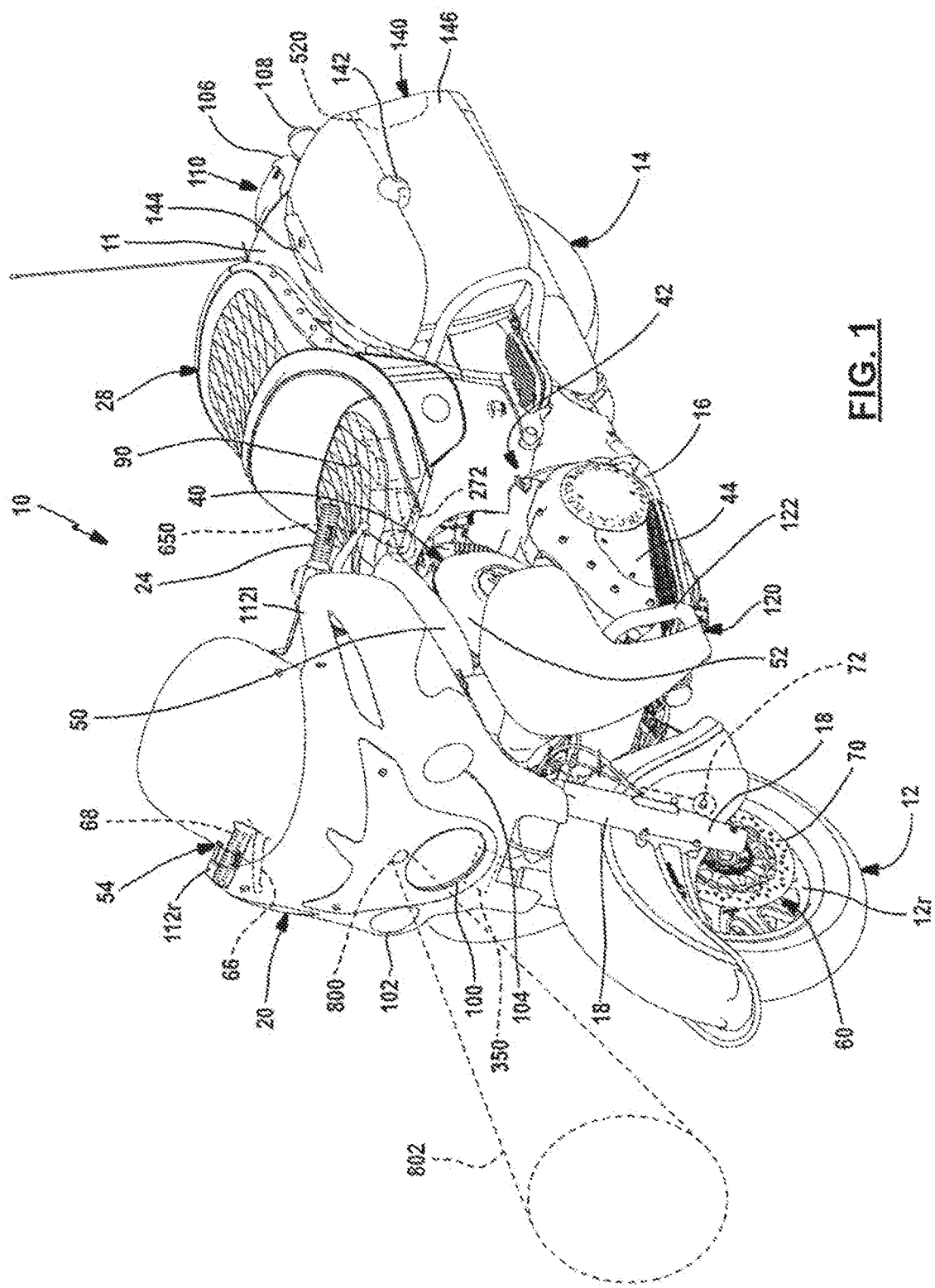
FIG. 1 is a perspective view of a motorcycle, according to various embodiments.

With initial reference to FIG. 1, a vehicle is exemplarily illustrated. The vehicle may include a two wheeled vehicle, which may generally be referred to as a motorcycle 10. The motorcycle 10 may be any appropriate motorcycle, such as the Chieftain® motorcycle or the Roadmaster® motorcycle, both sold by Indian Motorcycle International, LLC having a place of business in Medina, Minnesota. In various embodiments, the motorcycle or vehicle may be similar to the vehicle disclosed in U.S. Patent App. Publication 2016/0298807. Other selected motorcycle wheeled vehicles may include those with two-wheels or three-wheels and may also be referred to as a motorcycle, such as an autocycle, Freewheeler® tri-cycle motorcycle sold by H-D U.S.A. LLC, Spyder three-wheeled vehicle sold by Can-Am Bombardier Recreational Products Inc., or the Slingshot® three-wheeled vehicle sold by Polaris Inc. having a place of business in Minnesota.

Generally, the motorcycle 10 includes a first or front wheel assembly 12 and a second or rear wheel assembly 14. Both of the wheels 12, 14 may be provided as wheel assemblies that include a tire, rim, and other generally know components. The wheels 12, 14 may engage or roll on a road surface or ground or other appropriate surface during operation of the motorcycle 10 and may rotate relative to a frame assembly or structure 16. It is understood that the frame assembly 16 may include various components, including metal tubing, the engine and/or connections to the engine, and similar components that are connected to other components. The frame assembly 16 may have a front portion to which the front wheel assembly 12 is connected and the rear portion to which a rear wheel assembly 14 is connected.

The motorcycle 10, or vehicle, may include only the two wheel assemblies 12, 14. The motorcycle 10, therefore, may be only a two wheeled vehicle. In various embodiments, the vehicle 10 may be only single wheel driven, such as only driven by the rear wheel assembly 14. Thus, the motorcycle 10 may include only two wheels and be only rear wheel driven.

Additional components connected to the frame assembly 16 may include suspension components 18, which may include a fork assembly having springs therein, and a handlebar 24. Further, a fairing components 20 may be connected to the frame assembly 16, and may be moveable or fixed relative to the frame 16. Further, the frame 16 may support a seat or seat assembly 28 that may be used by an operator to sit on the vehicle 10 during operation.

The frame 16 may hold or support an engine 40. The engine 40 may include various components, such as those discussed further herein, and be a part of a powertrain assembly 42, which may further include transmission components or assembly 44. It is understood that various other components may be incorporated into the vehicle 10, such as those generally understood in the art, to allow operation of the vehicle 10 by a user, also referred to as an operator. The user may operate the vehicle, such as control the engine 40, for transferring power from the engine 40 to one or more of the wheels, such as the rear wheel 14 assembly, through the transmission 44.

In various embodiments the engine 40 may include an engine such as a Thunderstroke® engine sold by Indian Motorcycle International, LLC having a place of business in Medina, Minnesota. The engine 40 may include a spark ignition engine, where a spark ignites a petroleum product, such as gasoline, to move pistons. The gasoline, or other appropriate fuel, may be held first in a fuel tank 50 for delivery to the engine 40. Air may be used in combusting of the fuel and initially enters the engine assembly by an air intake 52. A throttle control 54 may be operated (e.g. twisted) by the operator to control a throttle body associated with the engine 40.

The motorcycle 10 may further include brake assemblies, such as a front disk brake assembly 60 associated with the front wheel assembly 12. It is understood by those skilled in the art that the rear wheel assembly may include a rear disk brake assembly. The rear brake assembly may be covered by various components of the motorcycle 10, such as saddlebags 140. The brake assemblies may be manually operated by the operator by brake controls. In various embodiments, a handle lever 66 may be actuated (e.g. squeezed toward a grip 68) to actuated the front brake assembly 60.

The front brake assembly 60 may include a brake disc 70 and a brake caliper assembly 72. As is understood in the art, the disc 70 is connected to a rim 12r of the wheel assembly 12. The brake caliper assembly 72 is fixed relative to the disc 70, such as to a portion of the suspension assembly 18. The brake caliper assembly 72 may be operated to squeeze the disk 70 to slow and/or stop rotation of the wheel assembly 12. A similar process may operate to slow the rear wheel assembly. The brake assemblies, such as the front brake assembly 60, however, may also use an alternative braking apparatus. For example, drum brakes or other braking systems may be used. Further, operation of the braking systems may be in any appropriate manner such as with a mechanical cable, a hydraulic braking system, or the like.

Figure 4:
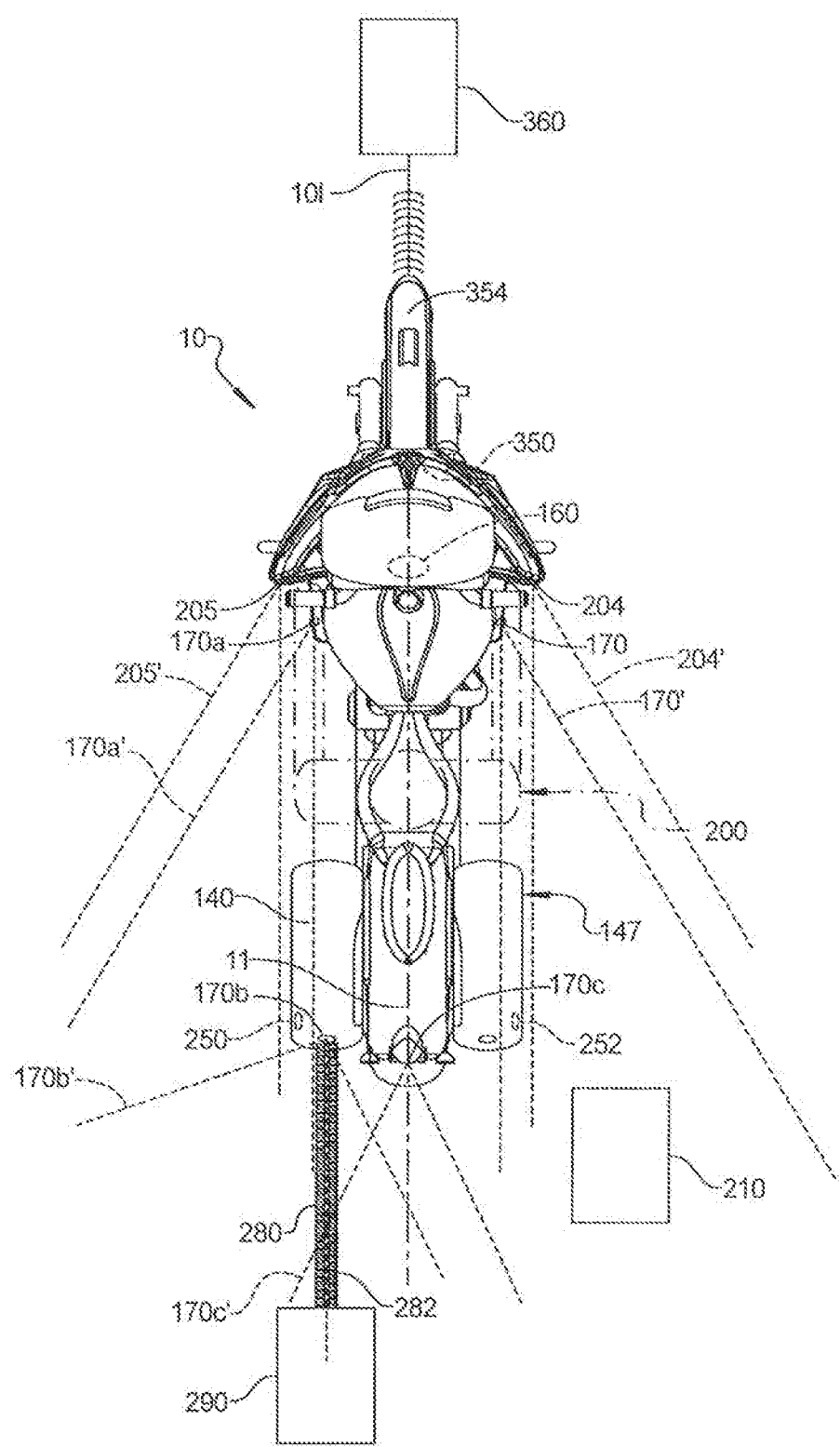
FIG. 4 is a top plan view of the motorcycle and various sensors associated therewith.

Operation of the engine 40, such as to create acceleration or deceleration of the engine may be performed independently and/or cooperatively with the braking system. For example, as noted above, the throttle 54 may be operated to increase the engine speed. An increase in engine speed may cause an increase in the vehicle speed of the motorcycle 10. In various embodiments, an engine control unit (ECU) 272 may control the engine 40 based on inputs from the rider 200 (FIG. 4). The ECU 272 and various controls, such as the fuel injectors, may be powered by a battery 90. It is further understood that various gear selections in the transmission assembly 44 may also operate to alter or change the engine speed of the engine 40 and/or speed of the motorcycle 10. As discussed further herein the various components, such as the brake assemblies and engine speed control assemblies may be used to alter a speed of the motorcycle 10. The operation of these controls may be substantially manual by an operator. In addition to or alternatively to manual operation, various systems may also be controlled substantially automatically such as by receiving input from various systems, as discussed herein, and executing instructions to achieve a selected result and speed of the motorcycle 10.

The motorcycle 10, therefore, may further include components that are operable or configured to execute instructions as discussed further herein. The motorcycle 10, therefore, may include one or more electrical sources such as a battery 90 that may be charged with a charging system that may include an alternator and/or a stator assembly.

In addition to the various assemblies, including the control systems as discussed above, the vehicle 10 may further include augmentation or accessory systems and/or accessory items. As discussed above, the motorcycle 10 may include fairing components 20 as discussed further herein, and briefly including a headlight or main light 100 and one or more auxiliary or passing lights 102 and 104. The auxiliary lights 102, 104 may also be turning lights or indicators and/or hazard indicators. Additionally the motorcycle 10 may include a rear or brake light 106 and one or more auxiliary or turn signal indicators 108 and 110.

The fairing component 20 may further include hand guard or lateral portions, such as a left handguard 112*l* and a right handguard 112*r*. The motorcycle 10 may further include a lower fairing or lower fairing components 120. The lower fairings 120 may surround and/or include highway or engine case bars 122. In various embodiments, the lower fairing 120 may include compartments or volumes that may be enclosed within the lower fairing 120. Further accessories may include one or more saddlebags 140. The saddlebags may include various components such as a hinge 142 and a lock or catch assembly 144. The saddlebags 140 may be of an appropriate design or selected design, such as a substantially hard case or semi-rigid case that includes a wall 146 of the saddlebag 140 that may maintain a selected shape, as illustrated in FIG. 1, under a selected pressure, such as during travel. The saddlebag 140 may define an internal volume, as discussed further herein.

In various embodiments, the fairing assembly 20, the lower faring assembly 120, and/or the saddlebag 140 may define compartments or have compartments that include various components or assemblies, as discussed further herein. In various embodiments, the motorcycle 10 may include selected cameras, sensors, emitter arrays, or the like, that may be positioned in the various components to provide information to various assemblies on the motorcycle 10.

Figure 2:
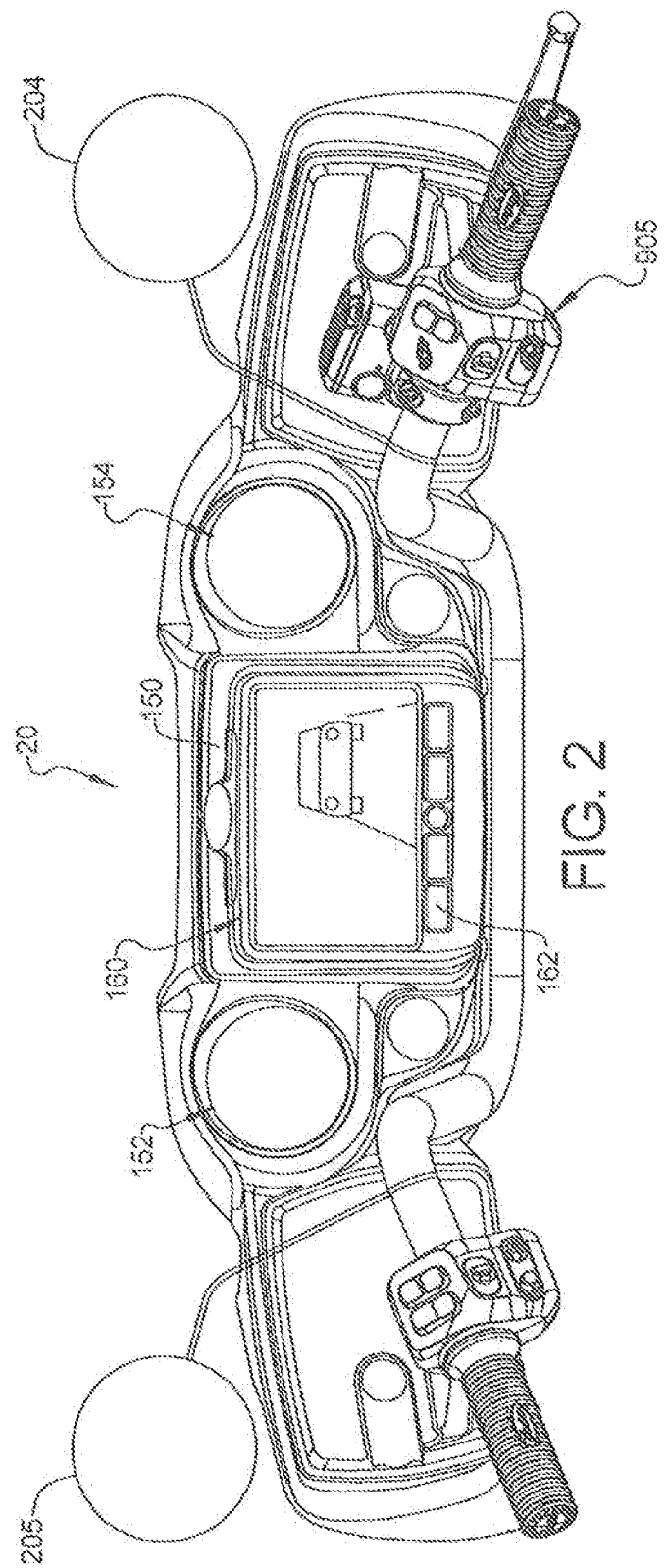
FIG. 2 is a view of the fairing assembly from a position of a rider.
Figure 3:
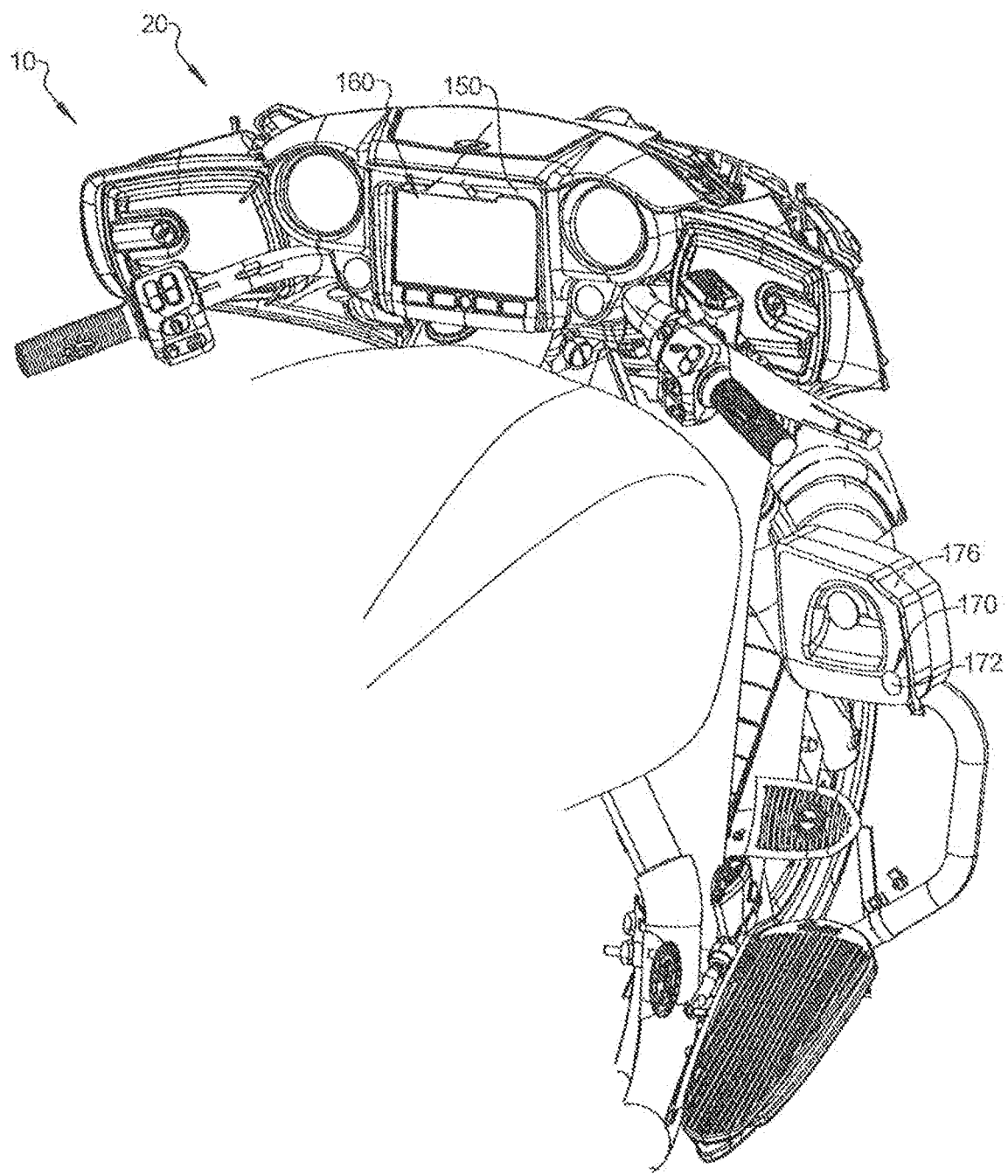
FIG. 3 is a schematic view of a position of a camera system mounted on a motorcycle.

With continuing reference to FIG. 1, and additional reference to FIG. 2 and FIG. 3, the motorcycle 10 may include a rider facing or rear facing portion of the fairing assembly 20. The rider facing portion of the fairing assembly 20 may include a rider facing side or surface 150. The rider facing side 150 may include various gauges, such as a speedometer 152 and a tachometer 154. In various embodiments, the fairing assembly 20 may further include a selectable display 160, such as a Ride Command® video display sold by Polaris Industries Inc. A selection may be made such that the display 160 may selectively display various information to the rider 200 (FIG. 4) whom is seated in the seat 28 in a selected manner. It is understood by one skilled in the art that the display 160 may be incorporated in various components of the motorcycle 10 alternatively or in addition to the display 160 in the fairing, for example rearview mirrors. The display 160 is mounted, generally, to allow the rider 200 to view the display device 160 without turning a head of the rider 200. That is, the rider 200 need not turn the rider's head from a direction forward of the motorcycle 10. The selection for information to display with the display 160 may be manually, automatically, or with a combination of automatic and manual input. The video display 160 may display information that may be selected by the rider 200, such as when the display 160 includes a touch screen, such as with the Ride Command® touchscreen display and control. Further, various input or selection buttons or manual controls 162 may also be provided to control the display 160. The controls 162 may be soft buttons that are programmable and provide manual input based upon an identification on the display 160.

As discussed herein, the various systems, such as cameras, sensors (e.g. radar, lidar, lean) may be connected to selected systems of the vehicle in an appropriate manner. For example, cameras for backup and/or blindspot viewing and detection may be directly wired into the display as a video input. The display may then receive inputs to display images from the selected cameras. Other systems, such as for cruise control and/or adjustable cruise control, various systems and sensors (e.g. brake controller, Inertial Monitoring Unit (IMU) 650, radar, lidar, camera) may be connected to a high speed communication bus that is connected to the engine controller (ECU).

Visual Feedback

In various embodiments, the display 160 may be a video display that displays a recorded or live video or picture feed from a selected camera. With continuing reference to FIG. 2, and additional reference to FIG. 3, a camera 170 may be mounted in the lower fairing assembly 120. The camera 170 may include a lens or portal through a portion of the lower fairing 120 to allow a selected wave length of light, such as visible light, infrared light, or other selected type of light, to reach a sensor of the camera 170. The camera may be any appropriate selected type of camera, such as a camera having part number PCC-15501, sold by Protech Global Solutions, LP having a place of business in El Paso, TX.

The camera 170 may be connected to the display 160 in a selected manner, such as directly via a wired connection, directly via a wireless connection, or indirectly such as through a selected processing system or unit. Selected communication protocols may include a controller area network (CAN) bus. In various embodiments the camera 170 may be connected with a controller or processing system or connected directly to the display 160 via a video connection thereto. The processor may be incorporated and/or in communication with an engine control unit (ECU) 272. Alternatively, or in addition thereto, a camera control processor may be provided with the camera 170.

The camera 170 may be used to capture an image of a selected area, such as an area behind and/or to a side of the motorcycle 10. The captured image may then be displayed on the display 160 as either a still (e.g. single image) or a plurality of images (e.g. a video display at a selected frame rate). The camera 170 may include a selected sensor such as a charge couple device (CCD) or a complementary metal-oxide semiconductor (CMOS), or other appropriate type of detector. The detector may detect light captured or transmitted through the lens assembly 172 that is then incorporated into the display 160 for viewing by the rider.

In various embodiments, the display of the display device 160 may be a live display and/or a display of a saved image. Accordingly, the display device 160 may be used to display live images from the camera 170 and/or display recorded and saved images from the camera 170. Further, the motorcycle 10 may include a memory system, such as included with the camera 170, to record a selected number of images captured by the camera 170, such as a selected amount of time of video display and/or selected number of still images.

In various embodiments, images or video captured with the camera may be saved to a selected memory for a selected period of time. For example, the rider may select that the images be stored at a selected rate for a selected time, such as on image every 1 minute. Further, image or videos may be saved until space in memory is filled and/or they are deleted by a user. Further, recorded images may be accessed and/or moved to a memory separate from the motorcycle. In various embodiments, a controller may be programmed to automatically store a selected amount of video and/or begin recording when a possible or imminent collision is about to occur. Thus, the images and video may be saved for review after a selected period of time.

Although the camera 170 is illustrated in the lower fairing assembly 120, it is understood that the camera 170 may include a plurality of cameras that may be also mounted in other locations. The camera 170 may alternatively be mounted and/or include additional cameras that are mounted near the handguard areas 1121, 112r and/or in the saddlebags 140. For example, the lens 172 of the camera 170 may be positioned through a wall 146 of the saddlebag 140 to capture images of a lateral side relative to the motorcycle 10 and/or to a rear of the motorcycle 10.

With additional reference to FIG. 4, the placement of the camera, such as the camera 170, allows for a view, such as a lateral or rearward view in areas or regions not generally viewable (e.g. blind spot) by the rider 200. For example, the rider 200 may be in a riding position relative to the motorcycle 10, such as facing forward and the front wheel assembly 12, and a mirror 204 may have a first viewing cone or volume 204'. The viewing volume 204', however, may not include a selected region or volume, which is generally understood or referred to as a blind spot. A second mirror 205 may also have a viewing cone 205'. The camera 170, however, may include a viewing cone or volume 170' that encompasses or includes at least a portion of a blind spot or covers an area or volume different than the viewing volume 204' of the mirror 204. In various embodiments, as discussed above, a second camera 170a may be included that has a second viewing volume 170a'. Additionally, as discussed above, the motorcycle 10 may include one or more saddlebags 140 that may include a camera 170b that may also have a field of view 170b' that may include generally an area or region to a side and/or rear of the motorcycle 10. The specific viewing angle of the camera 170b may depend on lens type and view angle and placement of the camera 170b. Further, a rear facing camera 170c may be provided and mounted to the motorcycle 10, such as at the fender of the motorcycle 10. In various embodiments, the rear camera 170c may be mounted to a bracket connected to a fender, a license plate holder, saddlebag mounting bracket, etc. Accordingly, one or more of the cameras 170 may have views relative to the motorcycle that are not easily viewable by the rider 200 and/or the mirrors 204, 205 even when the rider 200 is viewing the reflection in the mirrors 204, 205.

With reference to FIG. 2 and FIG. 4, the views of the selected cameras 170 may be displayed on the display screen or display device 160. The display device 160 may have a selected portion of the display 160 that is dedicated or selected to display the view of one or more of the cameras 170 and/or the entire display 160 may be dedicated when selected to display the view from a selected camera.

In various embodiments, different one or more cameras may be selected to provide a view to display 160 based upon input from the rider 200. For example, with reference to table 1 below, various inputs from the rider 200 may cause the display device 160 to display a view of one of the cameras.

TABLE 1

| Sensed and/or Rider Input | Display Camera |
| --- | --- |
| Right Turn indicator and/or right lean | Right Camera view |
| Left Turn Indicator and/or Left Lean | Left Camera view |
| Negative Velocity | Rear Camera view |

With reference to Table 1, the motorcycle 10 may include turn signals or turn signal indicator switch. If the rider 200 inputs a right turn indicator, a right camera view, for example, the camera 170, may be activated and its view displayed on the display device 160. Further various lean detection mechanisms, as discussed herein, may sense or determine a selected amount of lean of the motorcycle 10, which may also be used or alternatively be used to select a view of the camera 170. The right camera being displayed on the display device 160 may assist the rider 200 in determining whether a vehicle, such as another motorcycle, automobile, or the like, for example an object 210 is in the view cone or area 170'. The area 170' may include a "blind spot" that is not directly viewable by the rider 200 without turning the rider's 200 head, even when viewing the mirror 204. The display 160 may automatically switch to display the view of the camera 170 when the right indicator is indicated or activated. Accordingly, during a right hand lane change, right hand turn, or other right hand operation or right movement operation, the display screen 160 may display items viewable by the camera 170 on the right side of the motorcycle 10.

Similarly, when a left turn indicator is operated or activated, a left camera 170a may have its view displayed on the display device 160. Similarly, therefore, when the rider 200 operates the switch to indicate a left turn, the left camera having a view of the left camera 170a displayed on the display device 160 may allow the rider 200 to view the area 170a' which may not even be viewable by a mirror reflection 205' and/or easy movement of a head of the rider 200. Further various lean detection mechanisms, as discussed herein, may sense or determine a selected amount of lean of the motorcycle 10, which may also be used or alternatively be used to automatically select a view of the camera 170a. The rider 200 may also maintain a forward facing viewpoint while viewing other areas around the motorcycle 10 to allow for ease and efficient operation of the motorcycle 10.

Further the motorcycle 10 may include various inputs, sensors, and controls that may determine a velocity of the motorcycle 10, including a negative velocity and/or other system status such as sensing a down shift, brake input (pressure or mechanical), clutch disengaged (such as for a selected duration), decrease in throttle, or other appropriate speed related amounts. When a negative velocity is sensed or determined, a rear camera 170b may have its view displayed on the display device 160. In various embodiments, as the rider 200 is moving the motorcycle 10 in reverse or backwards, such as for parking or moving from a storage area, the rider 200 may view the display device 160 to see a view of the area or volume to the rear of the motorcycle 10.

In various embodiments, however, all of the cameras may be displayed on the display device 160 at various times, such as when a negative velocity is determined. For example, the display device 160 may be divided into three portions to allow for a left, middle, and right rear view of the motorcycle 10 on the display device 160 lternatively, various image stitching algorithms, generally known in the art, may be used to stitch two or more of images from the various cameras' images together into a single image. Thus, the displayed image or video image, may be a stitched image or video image to display an encompassing or panoramic view. This may allow the rider 200 to view an entire area or have a large field of view, such as about 90 to about 180 degrees on both sides of a longitudinal axis 101 of the motorcycle 10 when moving the motorcycle 10 in reverse.

Accordingly, the cameras 170 may be operated at a selected time, such as when an input is received from the rider and/or selected sensed input. Therefore, the cameras 170 need not be operated at all times that the motorcycle 10 is on. It is understood, however, that the cameras 170 may be operated such that the cameras are always on when the motorcycle 10 is on or in operation but that the display device 160 only selectively displays a view of one or more of the selected cameras based upon an input of the rider or a sensed input. Nevertheless, the display 160 may display a view of one or more of the selected cameras 170 to allow for ease or efficient operation of the motorcycle 10 by the operator or rider 200.

In addition to the cameras 170, discussed above, other sensors may be attached or connected to the motorcycle 10 as well. As discussed further herein, the additional sensors may assist in providing information to the rider 200 through various rider feedback systems. The additional sensors and feedback systems may allow the rider 200 to assess the environment around the motorcycle 10 for ease and efficient riding of the motorcycle 10.

Figure 5:
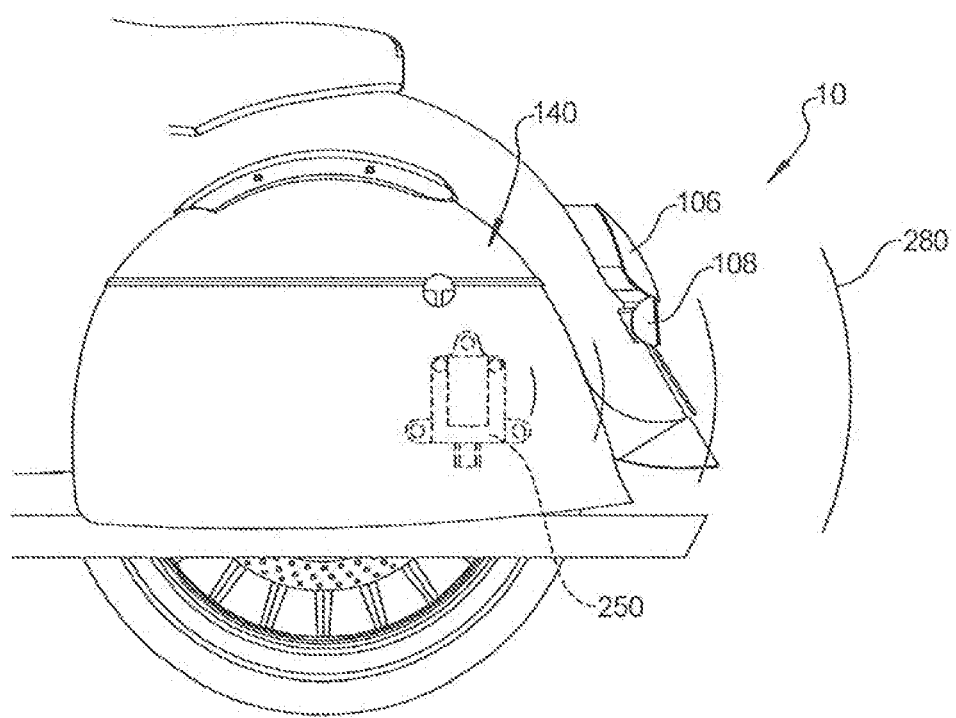
FIG. 5 is a detailed view of a motorcycle and a sensor assembly.

In various embodiments, the motorcycle 10 may further include or be installed to include a rear facing radar assembly. With reference to FIG. 1, FIG. 4, and FIG. 5, a radar assembly 250 may be installed into the saddlebag 140. It is understood that the radar assembly 250 may include two radar assemblies, one installed on either side of the motorcycle 10, such as the radar assembly 250 in the saddlebag 140 and a second radar assembly 252 in a second saddlebag assembly 141. The two radar assemblies 250, 252 may be substantially identical other than identified as left and right. Similarly, the saddlebag assemblies 140, 141 may be substantially identical other than being a left and right as well. Accordingly, the discussion herein of the radar assembly 250 and the saddlebag 140 will relate to either or both of the saddlebag assemblies 140, 141, and radar assemblies 250, 252, respectively unless specifically identified otherwise.

Figure 6A:
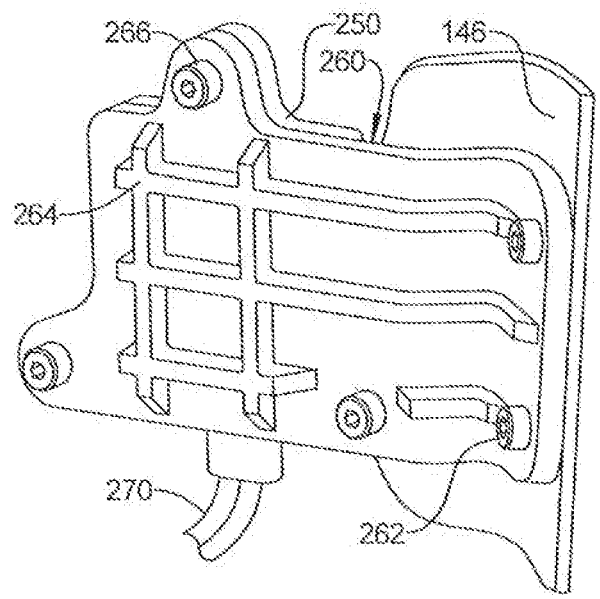
FIGS. 6A and 6B are detailed interior views of a mounting position of the sensor assembly.
Figure 6B:
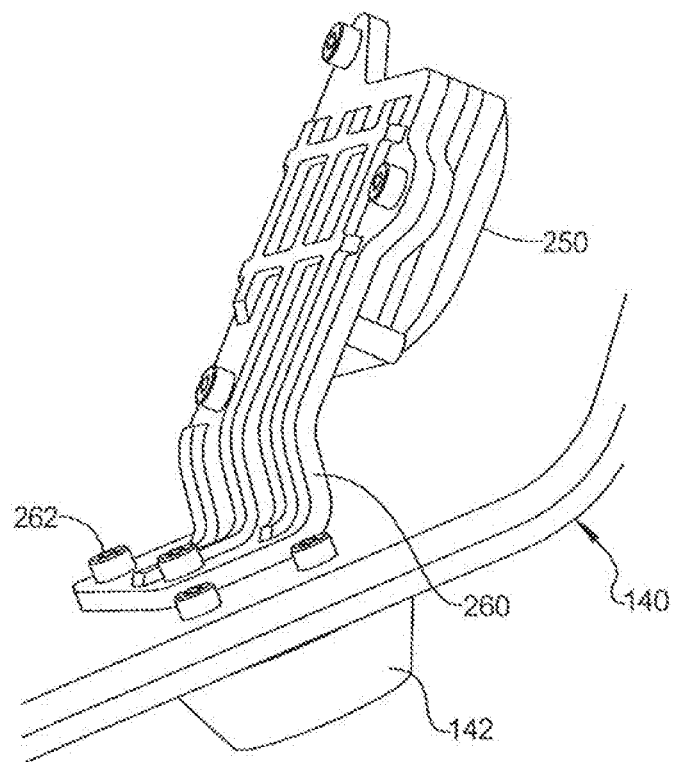

With additional reference to FIGS. 6A and 6B, in various embodiments, a bracket member 260 is formed to interconnect at least the radar assembly 250 with at least one wall or bracket of the saddlebag assembly 140. Moreover, it is understood that only a single one of the radar assemblies 250, 252 may be mounted to the motorcycle 10. For example, only the radar assembly 250 may be mounted on a rear fender 11 of the motorcycle 10 to include a view of a volume behind the motorcycle 10.

In various embodiments, when mounted in the saddlebag 140, the bracket 260 may be mounted or fixed to the rigid walls 146. In addition or alternatively thereto, the saddlebag 140 is mounted to the motorcycle 10, such as to the frame 16 with one or more bracket assemblies. Accordingly, the radar bracket 260 may be mounted or fixed to the saddlebag bracket for fixation of the radar assembly 250 relative to the motorcycle 10. Nevertheless, the radar assembly 250 is mounted or fixed to the bracket 260 which may be fixed with one or more fasteners 262 to the wall 146 of the saddlebag assembly 140. It is understood, however, that the radar assemblies 250, 252 need not be mounted to brackets. For example, if the saddlebag bracket and/or walls are of appropriate types, structure, etc. the radar assembly 250, 252 may be fixed directly to the wall and/or bracket. For example, adhesives or adhesive materials (e.g. double sided tape) may be used to fix the radar assembly 250, 252 to a surface. Thus, a hole or indent need not be made in the saddlebag or bracket to mount the radar assembly 250, 252.

When a bracket is used, the bracket 260 may be formed of a substantially rigid material such as a metal or metal alloy. In various embodiments, however, the bracket 260 may be formed of a selected polymer that does not interfere, such as absorb or reflect, radar waves. Various polymer materials may include Acrylonitrile butadiene styrene (ABS), glass filled nylon, etc. Further, the bracket 260 may include a selected shape or geometry, such as reinforcing ribs or members 264 to assist in providing rigidity to the bracket 260. In various embodiments, the radar assembly 250 is selectively fixed relative to the motorcycle 10 such that there is minimal movement of the radar assembly 250 relative to the motorcycle 10 during operation. Thus, the radar assembly 250 may be fixed to the bracket 260 in a selected manner such as with one or more fasteners 266 that hold the radar assembly 250 to the bracket 260.

In various embodiments, the radar assembly 250 may include a radar emitter and a radar receiver. The radar assembly 250 may further include various processing systems that are configured to execute instructions to determine position, speed, change in speed, etc. of objects external to the radar assemblies and/or relative to the motorcycle 10. The radar assembly 250 may include radar systems such as the ARS 400, ARS 441, and/or the SRR 320 radar systems, both sold by Continental AG, having a place of business in Michigan, USA. The radar assembly 250 may be configured to generate a radar signal and receive a reflected radar signal to determine a distance of a selected object, such as a motor vehicle, relative to the radar assembly 250. Various additional information may include an instantaneous speed (such as within a selected number of milliseconds from a report time) and/or a change in speed over a selected period of time. The radar assembly 250 may then generate a signal regarding the speed and/or position of the vehicle relative to the motorcycle 10 for further processing, as discussed further herein.

It is understood that the radar module 250 may also only transmit a signal regarding the received radar signal reflected from an exterior vehicle in a surrounding environment. The selected processing, as discussed above and further herein, may be performed by additional or alternative onboard processors, such as processor system within or connected to the engine control unit (ECU) 272. It is understood, therefore, that the radar module 250 may include or selectively calculate the position, speed, etc., of exterior items, such as the item or object 210, relative to the motorcycle 10. Further information regarding average or instantaneous speed of the motorcycle 10 may be delivered to the radar unit 250. Transmission of information to the radar unit 250 may be wireless and/or wired, such as via a connection 270 such as with the CAN bus. In various embodiments, as discussed above, the radar assembly 250 may communicate with the ECU 272 positioned away from the radar assembly 250, such as below the seat 28 and/or near the engine 40.

With continuing reference to FIG. 5 and additional reference to FIG. 4 the radar assembly 250 may emit a radar signal represented by curved lines 280. The radar signal 280 may encounter an object, such as an object 290 illustrated in FIG. 4, and/or the object 210. In various circumstances the object 290 may be a motor vehicle that is moving toward the motorcycle 10. The radar signal 280, as is generally understood in the art, may be emitted by the radar assembly 250, encounter the object 290, and be reflected back to the radar assembly 250. The radar assembly, or a selected processing system, may determine a position and/or speed of the object 290 based upon the reflective radar signal. The reflected radar signal may be represented as the reflected or returning lines 282. In various embodiments, the sensor assemblies may be operated to determine and measure different distances to different areas relative to the motorcycle 10. For example, the object 210 may be closer than the object 290 and the sensor assemblies may be operated to determine the difference distances and determine actions, as discussed herein, differently based on the different distances.

As discussed above the display 160 may display a view of one or more of the cameras 170 based upon a selected operation on input. For example, with reference to FIG. 7A, a flowchart or logic diagram 300 is illustrated. The flowchart 300 may be selectively operated in addition or alternatively to the logic illustrated and described in Table 1 above. In various embodiments, therefore, the rear camera, such as the rear camera 170c, may have its display displayed on the display device 160 and/or turned on or turned off. For example, with reference to the flowchart 300, the flow chart may be of an algorithm and related instructions for a processor (e.g. processor receiving a signal from the radar assembly 250, 252 and/or a processor that is a portion of the ECU 272) to determine whether or not the display 160 displays the view of the rear camera in block 310 or does not display a view of the rear camera in block 314.

The method may include a start block 318 which may be starting operation or turning on the ignition of the motorcycle 10. The flowchart 300 may then determine whether the speed of the motorcycle 10 is less than 5 miles per hour in block 320. If no, a NO path 322 is followed and a display of the rear camera is turned off in block 314. If the speed is less than 5 miles per hour, a YES path 324 is followed to a second optional determination block 326. In the second optional determination block, a determination of whether the clutch is pulled in and/or the motorcycle is in neutral is determine in block 326. If the clutch is not pulled in or the motorcycle is not in neutral, a NO path 328 is followed and the display of the rear camera is turned off or not displayed in block 314. Accordingly, if the speed is less than 5 miles per hour and if the clutch is not pulled in and/or the motorcycle is not in neutral in either instance a display on the display device 160 of the rear camera is not made.

If in the second optional determination block 326 is it determined, such as by receiving a single from a sensor, that the clutch is pulled in and/or the motorcycle is in neutral, a YES path 330 is followed to determine or receive other inputs in block 331. Other inputs may be determination of application of a brake, lean angle, etc. After other inputs are received in block 331, if selected, a determination of whether the radar has detected oncoming cars made in block 332. A determination of whether the radar has detected an oncoming car is based upon a sensed rate or approach to the motorcycle 10 and/or time calculated to possible impact. For example, the radar assembly 250 may sense a vehicle approaching the motorcycle at a relative speed of 20 miles per hour (MPH) and that the vehicle is 290 is 60 feet away. Thus, a determination may be made that the vehicle 290 is only about 2 seconds from impact. Any appropriate selected time to impact may be selected, however, for determination of impact.

Figure 7A:
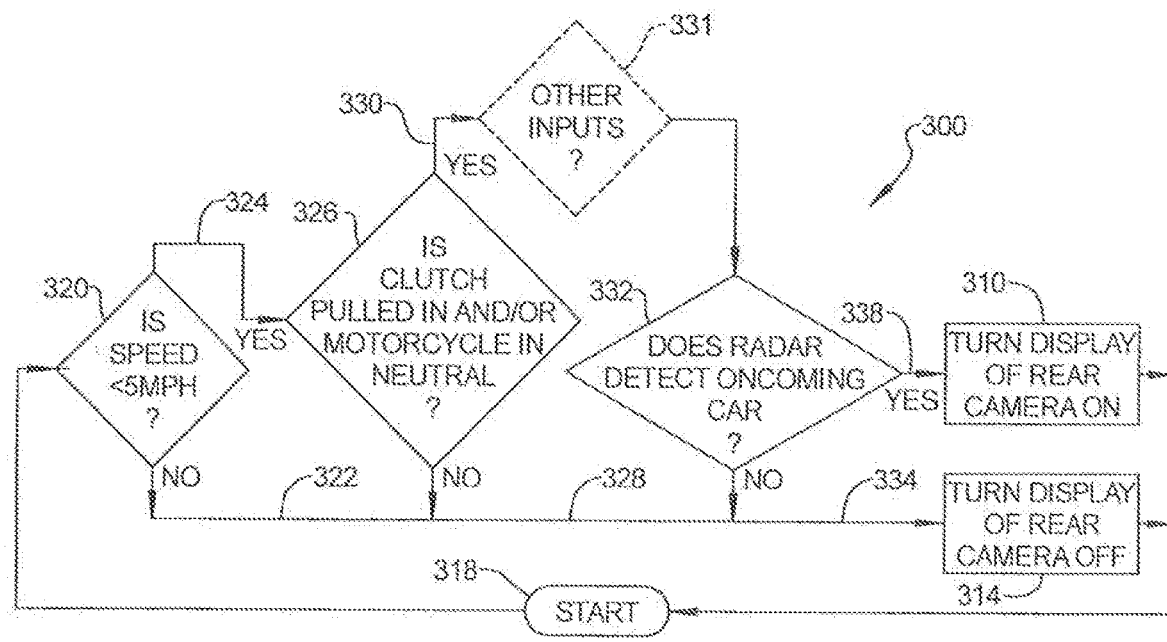
FIG. 7A is a flowchart for operation of a display of the motorcycle.

If it is determined that the radar is not detecting an oncoming car, a NO path 334 is followed and a display of the rear camera is not made in block 314. However, if the radar assembly 250 does detect an oncoming car a YES path 338 may be followed to display the rearview camera on the display device 160 in block 310. Accordingly, as illustrated in FIG. 7A, in various embodiments, a display of a rearview camera may be made even though the motorcycle 10 is not moving backward or does not have a negative velocity if the motorcycle has a selected forward velocity in block 320, the clutch is pulled in and/or the motorcycle is in neutral in block 326, and the radar assembly 250 detects an oncoming car in block 332. This may allow the rider 200 to view on the display device 160 the view of the rear camera in block 310.

As discussed above, with reference to FIG. 7A, the method 300 may be used to determine whether to display a selected camera image on the display device 160 to illustrate to the rider 200 whether a vehicle, such as the vehicle 290, is close to the motorcycle 10 and/or may possibly come in contact with the motorcycle 10. As discussed above in the method 300, however, the motorcycle is substantially at a stop or stand still or not under power. For example, the method 300 may be appropriate for a motorcycle when stopped at a traffic light and/or traffic signal. However, it is understood, that the rider 200 may also desire or be selected to be made aware that a vehicle is approaching with viewing the display 160 while the motorcycle is at a selected speed greater than 5 mph.

Figure 7B:
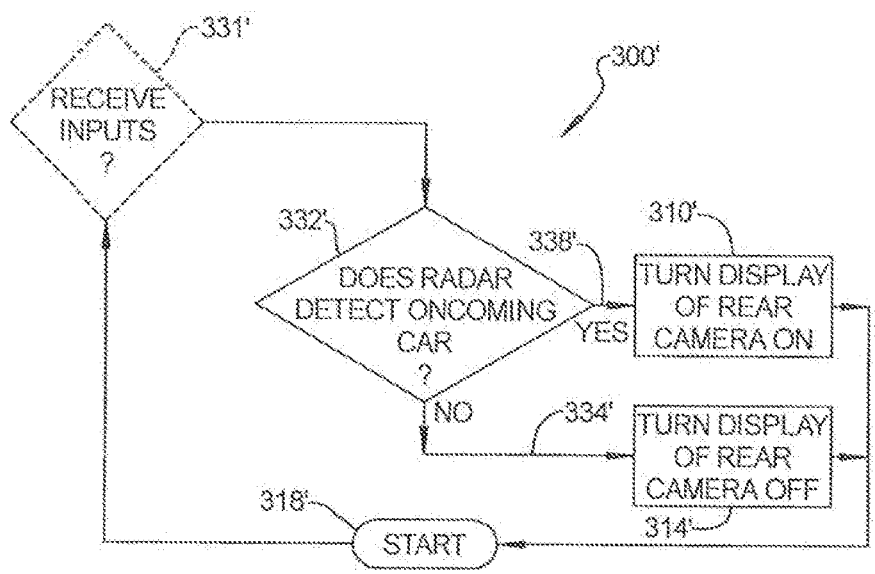
FIG. 7B is a flowchart for operation of a display of the motorcycle.

With reference to FIG. 7B a method 300', similar to the method 300, discussed above is illustrated. The method 300' is similar to the method 300 and similar or identical portions will not be described in detail, but the same reference numerals augmented with a prime will be used. Accordingly, the method 300' may turn a display of a rear camera on in block 310' or turn a display of a rear camera off in block 314'. The method 300' may start in block 318' and may receive inputs block 331'. Receiving inputs in block 331' may include the rider 200 activating a rear approach detection system on the motorcycle 10 and/or initiating or starting the motorcycle 10. The process may then begin an ongoing determination in determining from block 332' of whether the radar sensor detects an approaching car or vehicle. As discussed above, the determination of whether the radar detects an oncoming vehicle may be based upon a speed of a vehicle approaching the motorcycle 10, a distance of a vehicle to the motorcycle 10, or a possible time of impact or contact based upon a detected speed and distance of the vehicle. If no vehicle is detected, a NO path 334' may be followed to turn off display of the rear camera in block 314'.

Thereafter the process may reinitiate and a continued detection or determination of whether the radar is detecting a car in block 322' may occur. If a car is detected in block 332' a YES path 338 prime may be followed to turn a display on in block 310'. Accordingly, the display 160 may display a view of a rear camera, such as the rear camera 170c when a radar detects an oncoming car in block 332'. Accordingly, it is understood that a display of the rear facing camera may be made when the motorcycle 10 is substantially stopped or mostly stopped, as illustrated in method 300 or at a selected speed or any speed greater than 5 mph as illustrated in method 300'.

The rider 200 may then be made aware that a vehicle is oncoming at a selected rate of speed. For example, a determination of a detection of an oncoming vehicle in block 332 may determine whether the oncoming vehicle, such as the object 290, is slowing down at a selected rate, is stopped, or has another selected speed or position. The rider 200, therefore, need not attempt to turn around to view an area or volume behind the motorcycle 10 but may view the display device 160. Moreover, the display on the display device 160 may be made to display the view of the rear camera in block 310 substantially automatically in light of the algorithm of logic illustrated in FIG. 7A. Accordingly the rider 200 need not operate a camera, such as the rear camera 170c, but rather may operate the motorcycle 10 in a normal operating manner while the view of the display device 160 may automatically display the view of the rear camera 170c if an oncoming vehicle is detected.

It is further understood that the radar assembly 250, 252 is an exemplary sensor assembly. Alternative or additional sensors may include optical sensors, lidar (laser radar) sensors, etc. Thus, any appropriate sensor may be used to determine or for operation of the flowchart 300.

In addition to the radar assembly 250, 252, additional or further sensor assemblies, including additional radar assemblies may be attached to the motorcycle 10. In various embodiments, for example, the motorcycle 10 may have connected thereto a third or forward facing radar assembly 350. The forward facing radar assembly 350, as illustrated in FIG. 1 and FIG. 4, may be connected to and/or relative to the fairing assembly 20. In various embodiments, the radar assembly 350 may be incorporated into the front headlight 100. Alternatively, or in addition thereto, the radar assembly 350 may be connected to a bracket (similar to the bracket 260) that is connected to the headlight 100, front fender, ornamentation on the front fender, and/or other fairing components 20.

The forward facing or front facing (FF) radar assembly 350 may emit a radar signal generally in a forward direction or away from the motorcycle 10 as illustrated by the curved lines 354. The radar signal emitted from the radar assembly 350 may encounter an object, such as a front or forward object 360 relative to the motorcycle 10, as illustrated in FIG. 4. The front object 360 may be any appropriate front object, such as a car or 4-wheel vehicle that is in front of or forward of the motorcycle 10. Alternatively, or in addition thereto, as discussed further herein, the front or forward object 360 may be one or more motorcycles relative to the first motorcycle 10. As discussed further herein, the FF radar assembly 350 may assist in various systems such as a cruise control of the motorcycle 10, forward object detection and/or avoidance and the like.

Figure 8A:
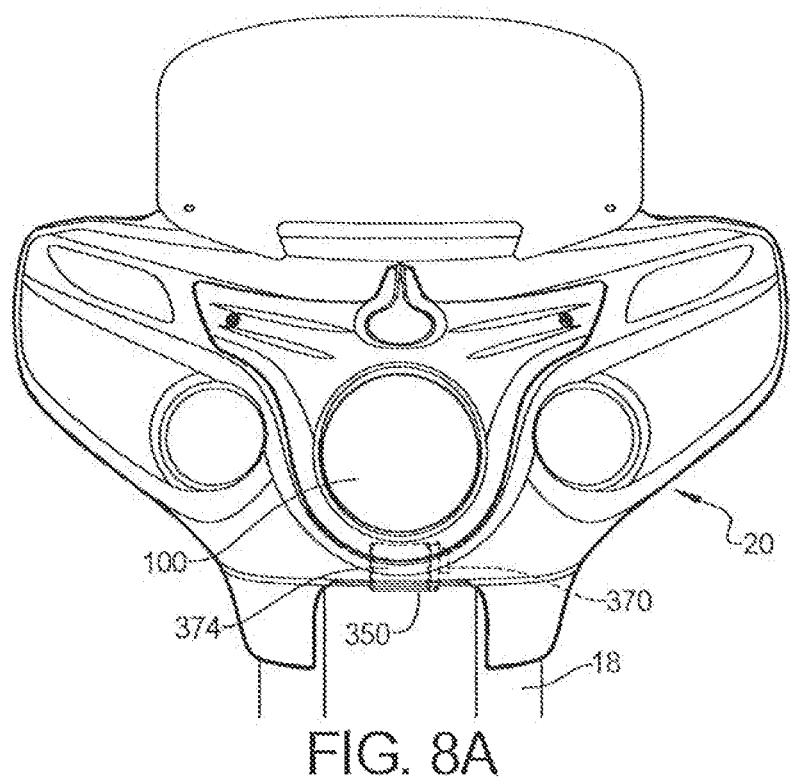
FIG. 8A and FIG. 8B are detailed schematic illustrations of a mounting assembly for a forward facing sensor assembly.
Figure 8B:
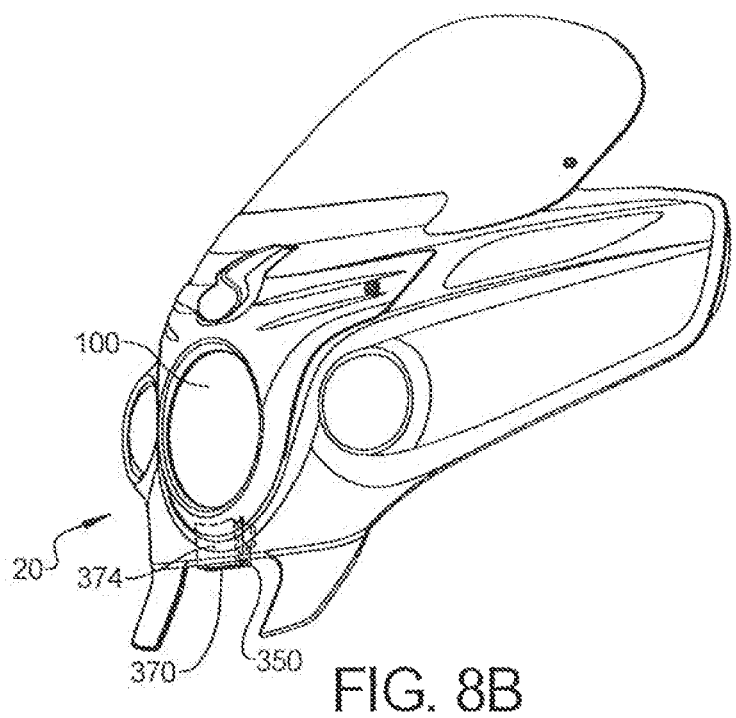

Initially, with reference to FIG. 8A and FIG. 8B, the radar assembly 350 may be mounted in a bracket assembly or bracket member 370 that is fixed to the fairing assembly 20 and/or the front fork assembly or suspension assembly 18. For example, the radar assembly 350 may be positioned in the bracket 370 substantially beneath the front headlight 100 and behind a body panel of the fairing assembly 20. The radar assembly 350, however, similar to the rear facing radar assemblies 250, 252, may emit the radar signal 354 that is unobstructed by a selected material of a body panel portion 374 such that the radar assembly 350 is not unobstructed from view exterior to the fairing assembly 20. The bracket assembly may mount to the light housing or lighting assembly, to a panel of the fairing assembly 20, or other appropriate portion. In various embodiments, therefore, the radar assembly 350 is fixed at a selected position relative to the motorcycle 10 for operation of the radar assembly 350.

In various embodiments, however, a separate or extra bracket or mounting portion may be necessary. The radar assembly 350 may be mounted to the fairing or other body portion directly and be placed and/or designed to operate without interference from the body panel, even if mounted behind the body panel.

As discussed above, the radar assembly 350 may include processing portions that allow the radar assembly 350 to determine a relative speed of the motorcycle 10 and the object 360, a change in speed of the object 360, and/or a change in speed of the motorcycle 10. In addition to speed or change in speed, a trajectory relative to the motorcycle 10 of the external object may be determined. Further, in various embodiments, a classification of the external object (e.g. tractor-trailer, small automobile, motorcycle) may be made. The radar assembly 350 may therefore include computational portions, such as a processor system, to allow for determination of speed and/or position of various portions. As an alternative, or in addition thereto, the signal may be transmitted from the radar assembly 350 to other processing systems, such as the ECU 272 for processing the signal from the radar assembly to make the determination of speed, position, and the like. Nevertheless, the radar assembly 350 may be used to transmit a radar signal from the motorcycle 10 to or reflect a signal from objects that are in front of the motorcycle 10, such as the object 360.

Haptic Feedback

Figure 9:
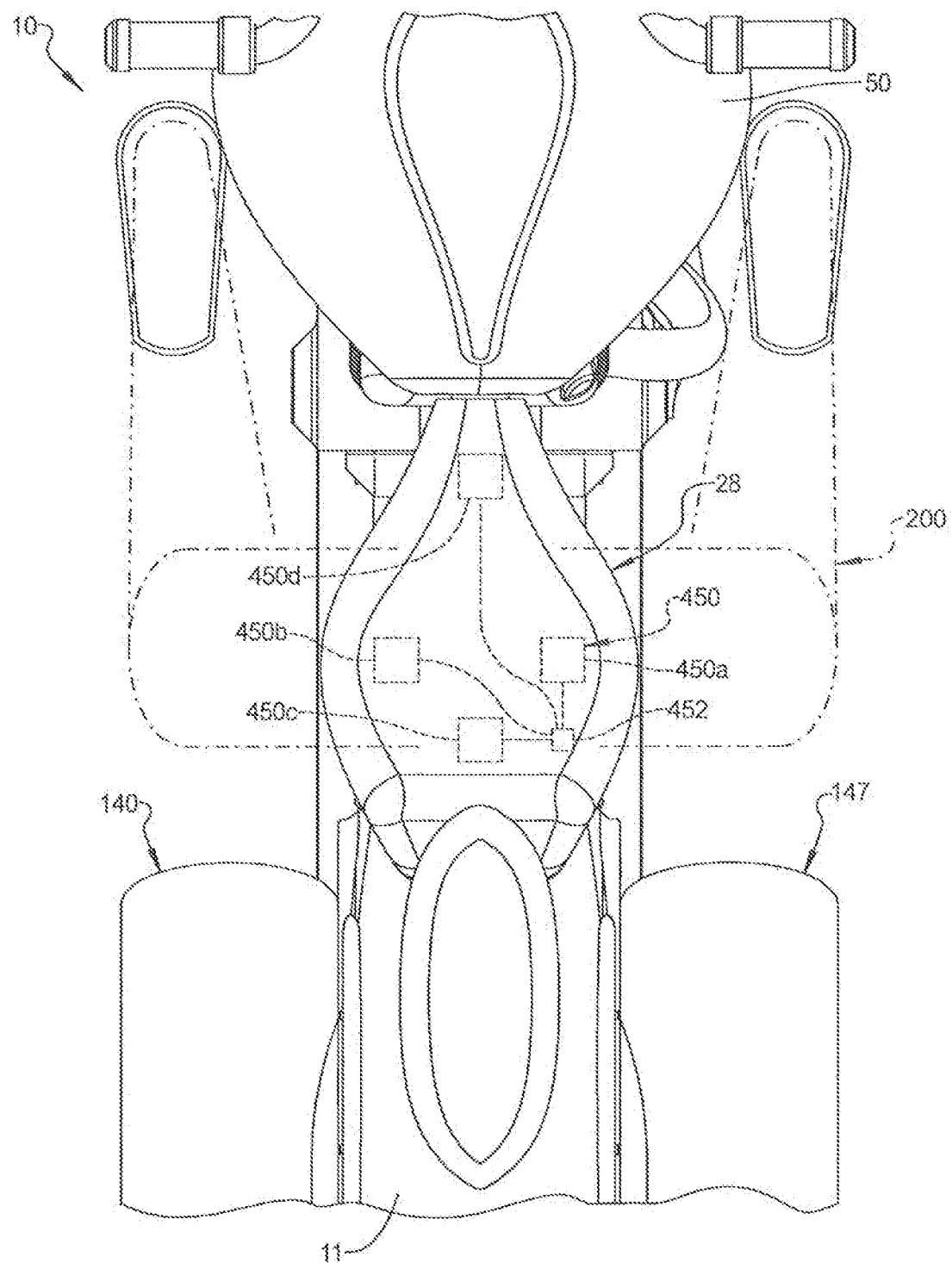
FIG. 9 is a top plan view of a seating assembly of a motorcycle.

In addition to the display 160, the motorcycle 10 may include additional feedback to the rider 200, such as a haptic feedback. The haptic feedback may include one or more haptic assemblies positioned in or on the seat assembly 28. With reference to FIG. 1, the seat assembly 28 is positioned on the motorcycle 10 such as rider 200 may sit on the seat assembly 28 during operation of the motorcycle 10. Turning reference to FIG. 9, the seat assembly 28 may include haptic feedback assemblies, such as one or more vibrational motors or vibrational motor assemblies 350. The motor assemblies 350 may include, with reference to a direction of the motorcycle 10 where the front wheel assembly 12 is the front of the motorcycle, includes a right vibrational motor assembly 450a, a left vibrational motor assembly 450b, and a rear vibrational motor assembly 450c. The vibrational motor assemblies 450 may further include a front or forward vibrational motor assembly 450d. The vibrational motor assemblies 450 may be any appropriate vibrational motor assembly, such as those that are operated or powered by an electrical source. The vibrational motor assemblies 450 may be powered by the battery 90 and may be connected thereto for a power source.

The motor assemblies 450 may be further connected to a controller, such as a vibrational motor controller 452, which may also be mounted in the seat assembly 28. The controller 452 may receive signals from various assemblies, such as the rear radar assemblies 250, 252. The controller 452 may further receive signals from other controllers, to operate the motors 450 in a selected manner. In addition, it is understood, that the controller 452 may include processing assemblies to allow for operation of the vibration motor assemblies 450 in a selected manner, as discussed further herein. Accordingly, the vibrational motor assemblies 450 may be operated to provide feedback to the rider 200 when the rider 200 is on the seat assembly 28.

The positioning of the motor assemblies 450 may provide directional or positional haptic feedback to the rider 200. For example, the rear vibrational motor assembly 450c may provide haptic feedback, such as a vibration, to a rear portion of the rider 200. The right and left haptic feedback motors 450a, 450b, may respectively provide left and right haptic feedback to the rider 200. Similarly the forward or front haptic feedback motor 450d may provide feedback or sensation to the rider 200 at a forward location.

In various embodiments, as discussed above, the radar assemblies 250, 252, may sense or be operated to sense or detect an object, such as the rearward object 290. As discussed above, the rearward object 290 may include a moving object, such as a car. Accordingly, the rearward object 290 may move toward the motorcycle 10 and the movement may be detected by the radar assemblies 250, 252. Based upon a sensed speed, position, change in speed, or the like, the display 160 may display a view from one or more of the cameras 170, as discussed above. In addition or alternatively to the display on the display device 160, the rider 200 may be given haptic feedback. The haptic feedback may be provided by the motor assemblies 450 positioned in the seat assembly 28. The feedback to the rider 200 may further include additional indicators including indicators on the display 160, light sources in the fairing assembly (such as on the panel or surface 150), and/or one or more lights in the mirrors 204 and 205. Further, various indicators may have multiple purposes such as turn indicators. The turn indicators may flash in a color other than indicating a turn, at a selected rate, or otherwise to provide an indication to the rider 200.

With reference to Table 2 in FIG. 9A, a logic or control conditions may be implemented as a conditional statement or expression to be executed by the controller 452 (as discussed above which may include processing assemblies) or other appropriate processing assemblies to send a signal to the controller 452 to control one or more of the selected haptic motors 450. In various embodiments, the various items in Table 2 have priorities including priority 1, priority 2, and priority 3. The logic may operate as an else-if logic wherein: (1) if a priority 1 feature is active, do all active priority 1 tasks then brake, (2) Else if check priority 2 feature criteria, if criteria is met then do all applicable priority 2 tasks then brake, (3) Else if check priority 3 feature criteria, if criteria is met then do all applicable priority 3 tasks then brake, and (4) If none of the priority features are active then provide no haptic feedback.

The various actions that may be taken are illustrated in Table 2 in FIG. 9A. The actions may occur given Forward notification, Rear approaching traffic, blind spot detection, and lane change assist. As illustrated in Table 2, various prerequisites may include that the motorcycle be moving at a selected speed, such as greater than 10 mph or less than 10 mph (including about or absolutely zero mph). Accordingly, if a priority 1 is determined the identified Tasks will occur. For example, in the first row, a Forward Notification may occur if the forward radar assembly detects the forward object 360, such as another vehicle, an obstruction, or the like. If detected visual feedbacks, such as LED's in the mirrors 204, 205, or on the fairing panel 150 may flash for a selected amount of time and at a selected rate. Further the central or forward haptic feedback motor 450*d* may operate to provide haptic feedback to the rider 200.

With continuing reference to Table 2 in FIG. 9A, in row 2, a rear approaching traffic alert may also be a priority 1 and may be operated if the motorcycle is traveling at greater than 10 mph and the rear radar assemblies 250, 252 have detected the rear object 290. Vehicle detection may be based on various sensor inputs and algorithms, as discussed herein. Feedback to the rider 200 may again include flashes of light and provide haptic feedback with the haptic feedback motors such as with the left and right motors 450*b*, 450*a*. In the row 3, a rear approaching traffic alert may also be provided if the motorcycle is traveling at a speed less than 10 mph (including at or substantially at zero mph), which may be similar or augmented by additional color lights, more intensive vibration or feedback with the haptic motors, or the like.

With continuing reference to Table 2 in FIG. 9A, the priority 2 features may be included or activated if none of the priority 1 features are activated but it is determined that the priority 2 is occurring. In particular, the priority 2 items may be a moderate or more moderate risk with the motorcycle 10 than determined under the priority 1 conditions. Accordingly, as illustrated in table 2, the feedback to the rider 200 may include constant lights or indicator lights, which may be the same light as used in the priority 1 instances, but not flash. Further, the haptic feedback motors 450 may operate differently than during priority 1 situations For example, the forward or central haptic feedback motor 450*d* may pulsate rather than be constantly on. Similarly, for a rear notification, the left and right 450*b*, 450*a* and/or the rear 450*c* haptic feedback motor may pulsate at a selected rate.

Finally, the priority 3 items may include a blind spot awareness and detection and/or lane change assist and feedback. Again the priority 3 item may be operational only if neither of the priority 1 instances, nor are priority 2 instances occurring. Accordingly, as illustrated in the Table 2 in FIG. 9A, during a left movement, such as a left lane change, a left mirror LED may be on and the left haptic feedback 450*b* may pulsate at a selected manner that may be different than the other pulsations or operations of the haptic feedback motor assembly 450*b*. Similarly for a right movement or lane change the right bright light may be operated and the right haptic feedback motor 450*a* may be operational at a selected rate, such as pulsating in a manner different than otherwise operated for providing haptic feedback. The feedback may be activated when the selected sensors, such as the radar assemblies 250, 252 and/or the cameras 170, or other appropriate sensors, sense objects in the selected right or left areas. For example, as illustrated in FIG. 4 is a right turn or lane change is occurring and the object 210 is detected the priority 3 feature may be activated.

The left and right lane changes may be determined based upon operation of the motorcycle 10 by the rider 200. In various embodiments, as discussed above, the rider 200 may operate turn signal indicators and the cameras 170 and/or the radar assemblies 250, 252, 350 may operate to sense or determine whether there are vehicles or obstacles in the direction indicated by the rider 200 by operation of the turn signal indicator. The feedback systems, such as the haptic feedback motors 450 may then provide the appropriate indication to the rider or feedback to the rider 200 if other vehicles or obstacles are sensed in the right or left areas, particularly in the blind spot areas of the motorcycle 10. It is further understood that additional feedback determinations may be made such as based upon a leaning of the motorcycle, amount of turning of the front suspension assembly 18, or other selected inputs to the controller 452.

Vehicle detection may be made for the various warning tasks, as noted above and illustrated at FIG. 9A and Table 2, such as for forward collision or detection identification (FCW), rear approaching traffic alert (RATA), blind spot detection or alert (BSD), or lane change alert or assist (LCA). For example, a probability of a collision may be used to determine a high, low, or moderate risk, or other risks. For example a speed and distance and/or change in speed of a vehicle approaching the motorcycle 10, or the motorcycle 10 approaching another object or vehicle, may be determined. Based upon the distance, speed, and/or rate of change of speed the determination may be made of a probability of a contact. For example, if the system determines that at a current speed and/or rate of change of speed and current distance that the motorcycle 10 is, for example, two seconds or less away from an object, the probability may be determined to be a high risk. If it is determined that the motorcycle and/or the object are at least five seconds away from each other, a moderate risk may be determined. If it is determined that the motorcycle and/or the object are at least ten seconds away from each other, it may be determined that no or low risk of collision is possible. It is understood that various times may also be determined, such as three seconds for a high risk, four seconds for a moderate risk, and greater than twenty seconds for no risk, and times are merely exemplary. Nevertheless, the determination may be made based upon the signal from various assemblies, such as the radar assemblies, and feedback may be provided to the rider such as hepatic feedback and/or display on the display device 160.

In various embodiments, the haptic feedback system may include more than the four motors 450a-450d, which may also be referred to as zones, and/or less than the four motors 450a-450d. For example, only the forward motor 450d and the rearward or aft motor 450c may be provided to give fore and aft haptic feedback. Similarly, only the left motor 450b and the right motor 450a may be provided to give left and right haptic feedback. Thus, the haptic feedback system need not only all four motors 450a-450d and/or only the four motors 450a-450d.

Non-Rider Notification

As discussed above, the various sensors, such as the rear facing radar assemblies 250, 252 and/or the forward facing radar assembly 350 may sense or detect objects exterior to the motorcycle 10. As further noted above, feedback may be given to the rider 200 of the motorcycle 10 regarding various sensed objects. In addition to feedback given to the rider 200, however, feedback or notices may be given to objects or individuals in the objects 290, to the rider of the motorcycle 10, and/or alternatively other vehicles.

With reference to FIG. 1, FIG. 4, FIG. 9, and FIG. 10, alerts may be given to the rider 200 and to operators of objects surrounding, exterior or external to the motorcycle 10, such as drivers of vehicles that may be the objects such as the rear object 290. As discussed above, various feedback may be given to the rider 200 based upon a detected approach of a vehicle, such as the rear object 290. Indications or notifications may be given to an operator of the rear vehicle as well.

As discussed above, with specific reference to FIG. 1, the motorcycle 10 may include various visual indicators, including one or more rear projecting lights. For example, left and right turn indicators 108, 110 may be present. Generally, the turn indicators may be a non-white color and may be operated in hazard mode where both left and right lights 108, 110 may be illuminated simultaneously and/or blink simultaneously. Further, the motorcycle 10 may include the central light, such as the brake light 106. The brake light 106 is also generally a non-white color such as red or a shade of red. Any one or more of these indicators may be illuminated at such a time to provide an indication to an oncoming vehicle. The notification may include when the motorcycle 10, as discussed herein, has detected that the oncoming vehicle is approaching at a high rate of speed, not slowing, or to indicate that the motorcycle 10 is slowing to further enhance visibility to an operator of the oncoming vehicle.

Figure 10:
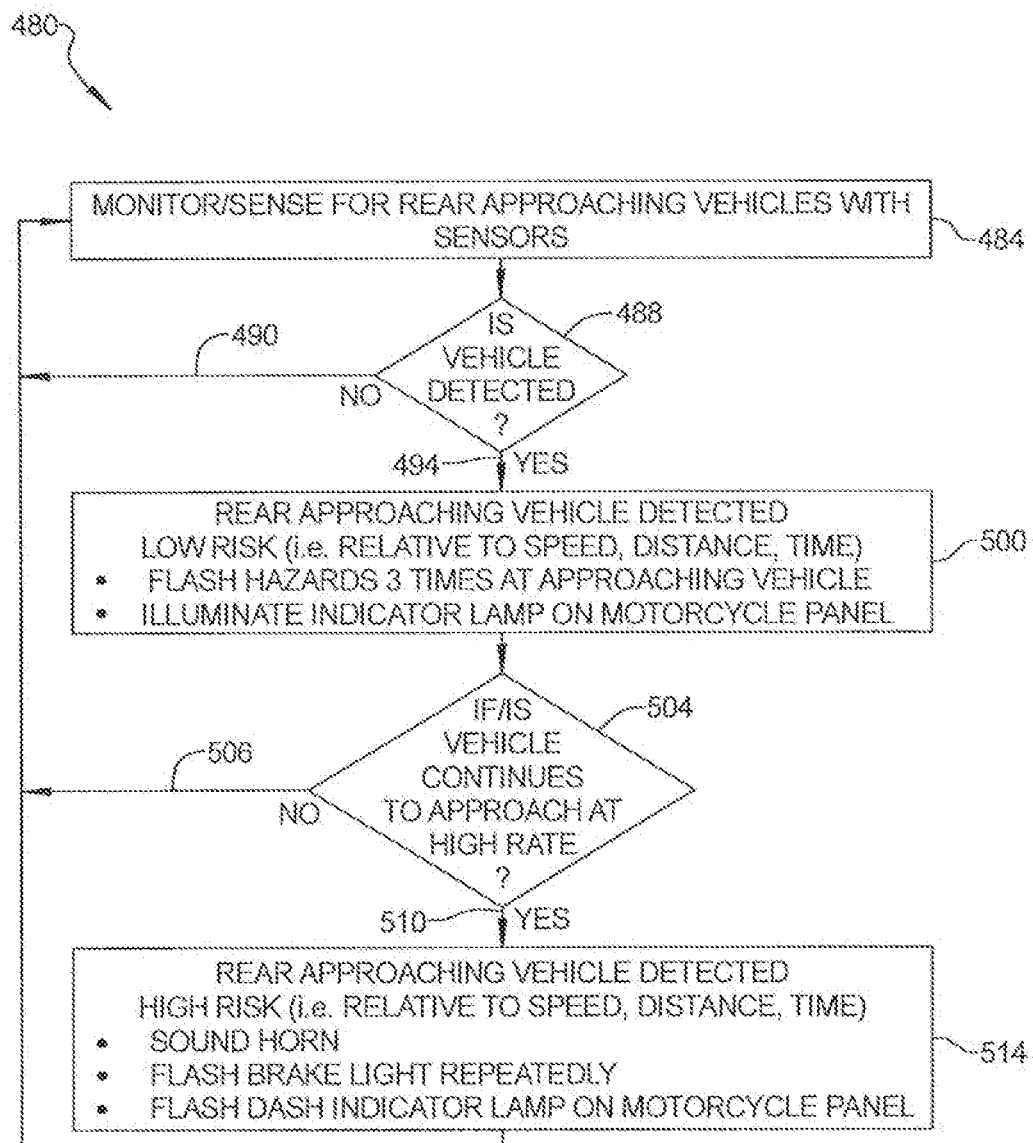
FIG. 10 is a flowchart for an external driver notification.

Accordingly, with reference to FIG. 10, selected notifications, such as visual or auditory feedback, may be given to the operator of the oncoming vehicle. For example, a flowchart 480 illustrated in FIG. 10 may include an ongoing or repeated monitoring or sensing of a rear approaching object or vehicle, such as the object 290, in block 484. A decision block 488 may be whether a vehicle is detected. If no vehicle is detected, a NO path 490 is followed to continue monitoring in block 484. If the vehicle is detected, a YES path 494 may be followed.

Detection of an approaching vehicle may include various determinations, such as noted above including relative speed of the sensed external object or vehicle, rate of change in speed, distance, etc. Detection or a positive determination of a detected vehicle may be that the speed of the external vehicle, such as object 290 (FIG. 4) is greater than 5 miles per hour faster than the motorcycle. Alternatively or additionally, if it is determined that the external vehicle is less than a certain time away, such as less than 2 seconds away given a speed, distance, and/or change in speed.

After following the YES path 494, a first driver indication can be made in block 500. The first indication in block 500 may be when the external object is traveling at selected low rate of speed (e.g. between 5 and 15 miles per hour), is at a selected distance away, is determined to be a selected time away, is traveling at a selected rate of speed relative to the motorcycle 10, or combinations of the above. Indications to the external driver may include flashing the hazard or the indicator lights, such as the lights 108, 110 a selected number of times at a selected speed, such as three times with about 500 milliseconds between each flash. A feedback may also be given to the rider 200, as discussed above in FIG. 9A, including flashing the turn signals on the panel 150 and/or a specific icon or indicator on the panel 160 of the fairing assembly 20.

After providing the initial indication in block 500, a determination of whether the vehicle continues toward the motorcycle 10 and has a certain condition (e.g. at a selected speed, distance and speed, time away, etc.) is made in block 504. If determination is that the vehicle or external object has slowed down and, therefore, is not continuing toward the motorcycle 10 at a selected rate of speed, a NO path 506 may be followed to continue monitoring in block 484.

If the vehicle continues or an object continues at a high rate of speed towards the motorcycle 10, a YES path 510 may be followed to provide further or additional indications to the driver in block 514. Further indications may include an auditory output such as sounding a notification system, such as a speaker, a horn other auditory output, such as a siren. For example, a directional speaker 520 (FIG. 1) may be mounted near the taillight 106 and/or in one or more of the saddlebags 140. The directional speaker 520 may be directed away from a rear of the motorcycle 10 such that the sound is directed toward the oncoming object 290. Further, the brake light 106 may flash at a selected rate, number of flashes, or other appropriate indication. Additionally, the brake light 106 may flash in addition to the indicator light 108, 110. The indications/notifications may be continued to be made from the motorcycle 10 in block 514 while continuing to monitor in block 484. The indications in block 514, therefore, may be made until it is determined that the vehicle 290 has slowed or stopped. Accordingly, output regarding approaching objects or items may be made to both a rider 200 into operators of the approaching objects.

Lean Determination

Returning into reference to FIG. 1, as discussed above, the motorcycle 10 may include various assembly portions such as the frame 16, the saddlebags 140, the highway/engine guard bars 122, and other selected components. In various embodiments, selected assemblies may be attached to different positions relative to these mounting portions that allow sensing of an area exterior or around motorcycle 10. In various embodiments, for example, with reference to FIG. 11A, the motorcycle 10 including the saddlebags 140, may include one or more sensors 600. The sensors 600 may be in a selected type of sensor such as an ultrasonic sensor, a laser imaging detection and ranging (LIDAR), Radar sensor, or other appropriate sensors.

The sensor 600 may emit a signal 602, such as an ultrasonic signal, that impinges a surface, such as a road surface 606. A reflected signal 608 may then be received by the sensor 600. The sensor assembly 600, or other appropriate processing system, may determine a distance between the sensor 600 and the surface 606 off which the reflected signal 608 reflects. The distance may be used to determine a lean angle or a position of the motorcycle 10 relative to the road surface. In addition, an Inertial Monitoring Unit (IMU) 650 may also be mounted to the motorcycle 10, as discussed herein, to measure selected orientations of the motorcycle 10 relative to the direction of acceleration of gravity and/or accelerations due to vehicle motion.

With additional reference to FIG. 11B and FIG. 11C, in various embodiments, the motorcycle 10 may include a sensor module on both a right and a left side, such as a first module 600 on the left side and a second module 600a on the right side. A central axis 612 may be formed between motorcycle 10 and the surface 606, such as a substantially perpendicular angle 614 when the motorcycle 10 is upright. Accordingly, both the sensors 600, 600a will sense the same distance or predetermined distance at the perpendicular angle 614. At certain conditions, however, the motorcycle 10 may be titled relative to the surface 606. As illustrated in FIG. 11C, the motorcycle may be titled such that the left sensor 600 is nearer the surface 606, such as a first distance 620, than a second distance 622 of the second sensor 606a. In this orientation, the motorcycle 10, or the axis 612 defined thereby, has an angle 624 that is greater than the angle 614. It is understood, however, that the complimentary angle, relative to angle 624 may be such as when the motorcycle is cornering in a left turn, the left side of the motorcycle is closer to the ground 606. Accordingly, the sensor 600, 600a is used to determine relative spacing of left and right sides of the motorcycle 10 relative to surface 606 for determine or assisting in determining a lean angle relative to the surface 606 of motorcycle 10. It is understood that a plurality of sensors may be positioned on either side, such as a plurality of sensors, which may assist in providing additional information or feedback regarding the sensed signals.

Additionally, the IMU 650, as illustrated in FIG. 1 and FIG. 11A, may include various sensors in addition to the sensors 600, 600a. The IMU 650 may include one or more gyroscopes, one or more accelerometers, and combinations thereof. The gyroscopes and accelerometers may be mounted in a fixed position relative to the motorcycle 10, such as with a bracket to the frame 16. The IMU 650 may be positioned substantially near a center of gravity of the motorcycle 10, including accounting for when the rider 200 is seated thereon. The IMU 650 may also be used to provide information or feedback regarding a specific location or orientation of the motorcycle relative to gravity. The accelerometer and gyroscope may be any appropriate accelerometer and gyroscope that may be integrated as one system or unit, or separate systems and unites. Exemplary accelerometers and gyroscopes include an iNEMO inertial module: always-on 3D accelerometer and 3D gyroscope, sold by STMicroelectronics NV.

In various embodiments, the information regarding a lean angle or an angle of the motorcycle 10 may include information from both the IMU 650 and the sensor 600, 600a. As discussed above, the sensor 600, 600a may be used to determine an angle of the motorcycle 10 relative to the surface 606. The IMU 650, however, may determine the angle of the motorcycle 10 relative to gravity which is generally toward a center of the Earth. It is understood that the surface 606, however, may not be perpendicular to the force of gravity. Accordingly, the actual surface 606 may not be entirely defined by the IM 650 is the surface 606 is not perpendicular to the direction of the force of gravity (e.g. a banked or slanted road surface). In various embodiments, therefore, it may be selected to include additional sensors, such as the sensor 600, to assist in determining lean angle of the motorcycle 10 relative to the surface 606. The additional information may be used for various purposes, as discussed herein, including compensating for movement of the motorcycle in possible directions of sensor detected signals, such as from the radar assemblies 250, 252 and 350. Further, the lean information may assist with any system that is interested or related to a tire's contact patch with the ground such as anti-lock braking systems (ABS) or traction control.

Sensor Assembly and/or Beam Movement

The motorcycle 10, as discussed above, may not always, be perpendicular to a road surface, such as the road surface 606 as illustrated in FIG. 11A and FIG. 11B. In various instances, such as when the motorcycle 10 is turning or maneuvering, the motorcycle 10 may be tilted relative to the road surface 606 as illustrated in FIG. 11C. As illustrated in FIG. 1, the radar sensor 350 may be mounted in a substantially fixed position relative to the motorcycle 10 and/or the fairing 20. In various embodiments, the fairing 20 may rotate when the operator 200 steers or turns the handlebars 24 of the motorcycle 10. Even if the radar assembly 350 is fixed relative to the motorcycle 10, such as the frame 16, so that it does not rotate, the movement of the motorcycle 10 may cause the radar assembly 350 to not point directly in front of the motorcycle 10 and/or along an intended path of the motorcycle 10.

With reference to FIG. 12A, in various instances the motorcycle 10 may be moving along a surface 606 and a beam or signal 350b is emitted by the radar assembly 350 substantially along an axis 101 of the motorcycle 10. The axis 101 may be the longitudinal axis of the motorcycle 10. As discussed above, the radar assembly 350 may be fixed such that the beam 350b emits a beam or cone that is substantially centered on the axis 101. In various situations, as illustrated in FIG. 12B, the motorcycle 10 and the beam 350b may not be directed along a path 606r of the surface 606, such as if the surface 606 is a road that is curved. Accordingly the beam 350b extending along the axis 101 may no longer encompass the forward object 360 as the road surface 606 causes the forward object 360 to not be within or entirely within the beam 350b. Further, as the motorcycle 10 turns during the path 606r the beam 350b, which is generally cone shaped, may also not be directed or substantially directed above a horizon or the surface 606, as illustrated in FIG. 12C.

As illustrated in FIG. 12C, the radar beam 350b, due to a lean angle, as determined as discussed above, of the motorcycle 10, may impinge or encompass a volume or area that would be below the surface 606. Accordingly, as the motorcycle 10 navigates or travels along the curved path 606r, the radar beam 350b may not be directed at an area or volume that is forward of the motorcycle 10. As discussed further herein, the radar sensor 350, therefore, may be moved relative to the motorcycle 10, to direct the radar beam 350b substantially away from the surface 606 and/or around the curved path 606r to maintain the beam 350b in front of the motorcycle 10 to allow to encompass or sense the vehicle 360.

As discussed above, as the motorcycle 10 begins to turn the motorcycle 10 may lean without substantially turning the direction of the radar assembly 350 as the motorcycle 10 may not have the fairing assembly 20 rotate as the motorcycle 10 is turning in the direction of the curve 606r. As is understood in the art, the motorcycle 10 may begin turning in the curve by leaning, which may not cause the radar assembly 350 to direct the radar beam 350b along the direction of the curve 606r. Further, as is understood in the art, the motorcycle 10 may be turned or maneuvered using a counter steer technique where the handlebars are moved in a direction opposite that of an intended direction of travel of the motorcycle 10. The counter steer technique may initially move the handlebars in the direction away from the curve direction 606r which would also cause the radar beam 350b to not be directed along the direction of the curve 606r.

In various embodiments, as discussed above, sensors may sense the lean angle of the motorcycle 10 such as with the IMU 650 and/or the sensor 600. Further, additional sensors may be provided to determine or sense the amount of turning of the handlebars 24 relative to the frame 16. Various sensors, such as the IMU 650 and/or the sensors 600 may assist in determining a direction of travel.

With additional reference to FIG. 13, the radar assembly 350 is schematically illustrated. The radar assembly 350 may emit the radar beam 350b. It is understood, however, that the radar assembly 350 illustrated in FIG. 13 is exemplary of any appropriate sensor assembly. The radar assembly 350, as discussed above, may be mounted relative to the motorcycle 10 in an appropriate manner. For example, the radar assembly 350 may be mounted in a fixed manner relative to the motorcycle 10, such as the fairing assembly 20. In various embodiments, the radar assembly 350 may be positioned on, such as fixed to, an actuator 700.

The actuator 700 may include various components, such as a stage 704 and a platform 706. The platform 706 may include a motor 710 that is connected to the stage 704 via a selected component, such as a rod 712. The motor 710 may be controlled, such as by the ECU 272 or other assemblies, such as the IMU 650, or the like based upon a determination of a lean angle of the motorcycle 10. The motor 710 may move the rod 712 to move the stage 714 in a selected manner to counteract movement of the motorcycle 10, such as leaning or tilting of the motorcycle 10, to ensure that the beam 350b is maintained in a selected direction. For example, as illustrated in FIG. 12B, the motor 710 may operate to twist or rotate the radar assembly 350 around an axis 716 in a selected manner to move the beam in the direction of the curve 606r. Thus, the beam 350b may be moved to maintain the beam 350b along an intended direction of travel of the motorcycle 10 regardless of the position of the radar assembly 350 relative to the motorcycle 10.

Movement of the radar assembly 350 to move the radar beam 350b may be based upon a determined amount of lean angle, rotation of the handlebars 24, or other appropriate considerations. For example, the actuator 700 may rotate to the radar assembly 350. For example, the radar sensor 350 may be rotated counter to the lean angle to overcome the movement of the beam 350b into the surface 606, as illustrate in FIG. 12C. Thus, the radar sensor may be moved one degree clockwise or each degree of lean counter clockwise, and vice versa. The radar sensor may also be rotated to follow the direction of the path of the motorcycle 10. Further, the motor 710 may be operated to move the stage 704 at an angle relative to the platform 706 in addition to rotating relative to the axis 716. Accordingly, the radar assembly 350 may be moved in an appropriate manner relative to the platform 706.

Further movement of the radar assembly 350 may be performed with other mechanical systems. For example, the radar assembly 350 may be mounted on a gimbal, such as a multi-axis gimbal, such that the single or multi-axis gimbal may be moved to direct the radar beam 350b based upon inputs from a selected amount of lean angle and/or rotation of the handlebars 24. Accordingly, the radar assembly 350 may be moved with a mechanical system in a selected manner to direct the radar beam 350b. Also, or alternatively, the radar sensor 350 may be moved with other systems, such as a headlight.

In further embodiments, however, selected beam shaping or forming mechanisms may be used to direct the beam 350b relative to the radar assembly 350. In various embodiments, therefore, the radar assembly 350 may be maintained in a fixed location and positioned relative to the motorcycle 10, but the beam 350b may be moved relative to the radar assembly 350. In such a system the beam 350b may be shaped or formed with electronic means, such as frequency modulation. Further, mechanical system may cause the beam 350b to moves such as with one or more antenna arrays of the radar assembly 350 being moveable without moving a physical case or housing of the radar assembly 350. Accordingly, the radar beam 350b may be moved in a manner as discussed above, without moving the radar assembly 350.

Automatic Following Distance and Cruise Control

The motorcycle 10 may include systems that are configurable by the rider 200 for various purposes. For example, a cruise control may include an electronic switch or selector 905 that allows the rider 200 to select a speed to maintain the motorcycle 10. The cruise control may include cruise controls such as those generally known in the art, including cruise controls included on the Roadmaster® motorcycle, as discussed above. The cruise control may selectively maintain the motorcycle at a selected speed. In various instances, however, the speed of the motorcycle may be selected to be altered due to various situations, such as an object that is in a selected or intended path of the motorcycle 10. The motorcycle 10, as discussed above, may include the radar assembly 350. The radar assembly 350 may include various features to identify and determine positions, speeds, and changes in speed of objects in front of or in an intended path of the motorcycle 10. In addition to the radar assembly 350, with reference to FIG. 1, the motorcycle may include one or more camera assemblies 800 that includes various portions such as a lens that has a field of view 802 of an area forward of the motorcycle 10. The camera 800 which may be positioned and configured to obtain a view of a road or surface 606 in front of the motorcycle 10.

Turning reference to FIG. 14, the motorcycle 10 may be moving generally in the direction of an intended path, such as the direction 850. As the motorcycle 10 is moving in the direction of 850 the motorcycle 10 may be on the surface 606 with other vehicles. Generally, the motorcycle 10, particularly including a cruise control system, may be traveling on a road surface. The road surface may be divided into multiple lanes, such as with lane markers 860. The lane markers may include various features, such as paint on the surface 606, particularly paint that is a different color than the road surface. Other possible road markers 864, 866 may also be present such as a shoulder road marker or additional lane indicator markers 864 and 866. For illustration, as illustrated in FIG. 14, the lane markers 860 may identify a separation of a first traffic lane 870 and a second traffic lane 874. The first traffic lane 870 may be traveling in the same direction as traffic in the second traffic lane 874, or the flow of traffic may be contrary to each other, as discussed further herein.

In various embodiments, however, the motorcycle 10 may be traveling with or in the lane of traffic 870 with one or more motorcycles such as a second motorcycle 880, a third motorcycle 884, and a fourth motorcycle 888. The motorcycles generally traveling in the same direction and/or lane as the motorcycle 10 that are sensed or identified by the system, such as one or more radar systems as discussed herein, may be referred to as targeted or identified forward motorcycles. Other vehicles or motorcycles may also be target or identified, but may not be referred to as forward targeted motorcycles if not generally traveling in the same direction of travel as the motorcycle 10. For example, a fifth motorcycle 890 may also be present in the second lane of traffic 874. In various embodiments, even if traveling in the same direction as the motorcycle 10, the fifth motorcycle 890 may not be a forward targeted motorcycle as it is not in the same lane as the motorcycle 10. Additionally, as discussed above, other lanes of traffic or possible lanes of traffic may include a third lane of traffic 876, as discussed above. According to various embodiments, a car or large vehicle 894 may be present in the third lane 876 and may also be generally traveling in the same direction 850, as discussed above.

The motorcycle 10, including the various sensors such as the radar assembly 350 and/or the camera assembly including the lens 800, may sense and/or view the lane 870 in which the motorcycle 10 is traveling including the lane indicators 860 and/or 864 and the various other vehicles relative to the motorcycle 10, including the second motorcycle 880, the third motorcycle 884, the fifth motorcycle 890, and the large vehicle 894.

During the riding of the motorcycle 10, the motorcycle 10 may be ridden in a single lane, such as the first lane 870 in a staggered formation. In a staggered formation the motorcycle 10 may be traveling along a path 900 with the third motorcycle directly in the path 900, but a selected distance 901 therefrom. In the staggered formation, the second motorcycle 880 is laterally offset, such as to the right, of the motorcycle 10, but in the same lane. Further, the second motorcycle 880 may travel along a path 910 with the third motorcycle 884 and be laterally offset therefrom and the fourth motorcycle 888 directly in front of the second motorcycle 880 along the path 910 all within the same lane. The large vehicle 894 may be laterally offset, such as in the third lane 876, from any of the motorcycles 10, 880, 884, 888. Additionally, the fifth motorcycle 890 may be in the second lane 874 which may be traveling in the same direction or contra to the motorcycle 10. Nevertheless, the lane markers 860 separate the first lane 870 from the second lane 874.

In various embodiments, therefore, the motorcycle 10 including the selected sensors, such as the radar assembly 350 and/or the camera assembly 800 may view or determine the lane 870, such as by identifying the lane markers 860 and lane markers 864. Within the first lane 870, the selected sensors, such as the radar assembly 350 and/or the camera 800, may sense or view the second motorcycle 880 and the third motorcycle 884. As discussed above, the radar assembly 350 may emit the radar signal beam 350b and detect a reflected radar signal to identify the selected vehicles external to the motorcycle 10, such as the second motorcycle 880, the large vehicle 894, and the fifth motorcycle 890. It is understood that additional motorcycle or non-motorcycle vehicles may be in the same or additional lanes as the motorcycle 10, such as the second lane 874 or the third lane 876 and those discussed here are merely exemplary.

For example, the radar assembly 350 may identify the second motorcycle 880, the third motorcycle 884, the fifth motorcycle 890, and the large vehicle 894. In addition thereto, or alternatively thereto, the camera sensor 800 may identify the lane markers 860 and 864 to identify the lane 870 in which the motorcycle 10 is traveling. The various inputs may be provided to a selected processing system, such as the position processor or the cruise control system which may include or be incorporated into the ECU 272. As discussed further herein, the ECU 272 may include processors to execute selected instructions for automatically controlling cruise control in the motorcycle 10, providing feedback to the rider 200 as discussed above, providing signals to other drivers, as also discussed above, or the like.

As illustrated in FIG. 14, in the first lane 870 a plurality of motorcycles, including the first, second, third, and forth motorcycle, or even just a first and second motorcycle 10, 880, may ride in a staggered formation in the single first lane 870. A staggered formation, as is understood by one skilled in the art, may include that two motorcycles, including the first motorcycle 10 and the second motorcycle 880 not riding abreast of one another within the single lane 870, but offset a selected lateral distance, such as a distance 950 between the lane markers 860, 864 in the first lane 870. In the staggered formation, however, the second motorcycle 880 is a selected distance 960 forward or in front of the first motorcycle 10. If more than two motorcycles, such as the third motorcycle 884, is in a staggered formation the third motorcycle is also offset a lateral distance 964, which may be the same distance 950. The third motorcycle 884 may be a distance 968 forward of the second motorcycle 880 and the distance 901 forward of the first motorcycle 10 along the path 900. Although the offset lateral distances 950, 964 may be substantially identical, the forward distance 960 is generally less than the distance 901, while it may be the same as the distance 968. In the staggered formation, any appropriate number of motorcycles may travel in the first lane 870, or any other appropriate single lane of traffic. The lane may be marked with lane markers, such as the lane markers 860, 864.

Further, the single lane 870 may be divided into two or more internal or imaginary lane partitions. As illustrated in FIG. 14 the single lane 870 may include a first lane partition 870a, a second lane partition 870b, and a third lane partition 870c. The lane partitions 870a, 870b, 870c may be imaginary and/or determined by a sensor system, such as a forward facing camera and processor system. The lane partitions 870a, 870b, 870c may each generally include about ⅓ of the lane width, such as the width of the lane 870 that is between the markers 860 and markers 864. A motorcycle that is laterally offset is generally at least in a different lane partition that the subject motorcycle, such as the second motorcycle 880 is laterally offset from the first motorcycle 10.

The radar assembly 350 may emit the beam 350b into the environment around the motorcycle 10 and it may impinge upon or encompass and/or be reflected by at least the second motorcycle 880, the third motorcycle 884, the large vehicle 894, and the fifth motorcycle 890. The radar assembly 350, as discussed above, may identify position relative to the motorcycle 10, speed of the various objects, change in speed of the various objects, and relative speed to the motorcycle 10. In addition, as discussed above, the forward facing camera 800 may view the forward path of the motorcycle 10.

In various embodiments the ECU 270 may include a processor that executes instructions to identify various features of the surface 606 such as the lane markers 860, 864 and objects in the forward path of the motorcycle 10. Accordingly, the camera 800 may also acquire an image of the second motorcycle 880, third motorcycle 884, fifth motorcycle 890, and large object or vehicle 894. It is understood, however, selected processor system may be separate from, even if in communication with the ECU 272. As noted above, various direct connections, BUS data communications, and others are possible for communication between the sensors, such as the radar sensor 350, and one or more processors.

In various embodiments, the rider 200 may operate a cruise control on the motorcycle 10. As discussed above, the cruise control may operate to selectively maintain a speed of the motorcycle 10 that is selected by the rider 200. The cruise control may be set with one or more switches 905 (FIG. 2), but may be augmented or changed with manual and/or automatic input to adjust a speed of the motorcycle 10 to maintain a set distance, such as the distance 960, from the second motorcycle 880 and/or the third distance 901 from the third motorcycle 884.

In various embodiments, therefore, the various sensors of the motorcycle 10 may be operated to inform the cruise control or an automatic cruise control of the motorcycle 10 with feedback and/or automatic motorcycle operations regarding obstructions. The feedback may also be given to the rider 200, as discussed above. The feedback to the cruise control, however, may assist in operation of the motorcycle 10 relative to the second motorcycle 880 and/or the third motorcycle 884 substantially automatically.

Additionally, even if in an initial staggered riding formation, as illustrated in FIG. 14, a plurality of motorcycles, such as the first motorcycle 10, the second motorcycle 880, and the third motorcycle 884 may move or form a substantially single file configuration when encountering a curve, to form a selected single riding lane or line 870c as illustrated in FIG. 15. The curved first lane 870c may include or be defined by curved lane markers 860c and 864c. The first motorcycle 10 may be positioned substantially directly in line or behind the second motorcycle 880 a distance 1000 on a substantially identical or selected single path through the curve of the curved first lane 870c. Similarly, the third motorcycle 884 may be a distance 1004 in front of or forward of the second motorcycle 880. In the situation where a plurality of motorcycles are traveling around the curve 870c, therefore, the plurality of motorcycles may be in or move to a substantially single path until a straight portion of the first lane 870 is encountered again and the stagger formation is reformed. Accordingly, in a changing situation where the second motorcycle 880 moves from an offset position, such as offset by the distance 950 to an offset that is substantially zero, relative to the first motorcycle 10, the distance 960 of the first motorcycle 10 from the second motorcycle 880 may change to the distance 1000. The change in riding configuration, however, may not require an indication to the rider 200 that a collision is possible or eminent between the motorcycle 10 and an object in front of the motorcycle 10, such as the second motorcycle 880. When the change in formation occurs, feedback to drastically change a speed of the motorcycle 10 to the rider 200 need not be given. The cruise control system may automatically lower the cruise control speed to achieve the distance 1000, which may be substantially identical to the distance 901, which is a distance between two motorcycles on a single intended path. The speed may change with a changing the engine speed, such as via the ECU 272, and/or the application of a selected braking force such as via the brake controller.

With reference to FIG. 16A and FIG. 16B, and continuing reference to FIGS. 14 and 15, the motorcycle 10 may include an adaptive or intelligent cruise control that) may operate according to the flowchart 1100 as illustrated in FIG. 16A and FIG. 16B. In the flowchart 1100, the process begins in start block 1104 and then to a determination or analysis block 1106 to determine whether the adaptive cruise control (ADC) is on or off. It is understood that the start block 1104 may be entered upon ignition of the motorcycle 10, the motorcycle 10 achieving a selected speed (e.g. 10 mph), or other appropriate start criterion. Accordingly, the process 1100 may be operated or executed by a processor in the ECU 272, or other appropriate processor system. Generally, the ECU 272 may be in communication with a cruise control system to operate the engine 40 at a selected speed. Further, the ADC may be in communication with one or more controllers for the braking systems 72. In various embodiments, however, the process 1100 may be incorporated into instructions and/or a logic that is executed by the processor system in the ECU 272 or other appropriate processor system.

If the ADC is determined to be off in block 1106, an OFF path 1110 is followed back to the start block 1104. It is understood that a selected of a non-ADC may also be made that is not explicitly included within the flowchart 1100. The non-ADC may operate as a commonly known cruise control that attempts to maintain a selected speed of the motorcycle. The flow path 1100 may be understood to be a loop, according to various embodiments, upon operation of the motorcycle 10.

If the cruise control is determined to be on, such as selected by the user or programed by the rider 200, an ON path 1114 is followed to a determination block 1120 to determine whether a cruise control system and/or sensor error is present. The sensor error may include the radar assembly 350 that is not sending or receiving a signal or other error state. It is further understood that other sensors that may be incorporated into the cruise control method 1100 may also have error states. If errors from the sensors are detected, then receiving or altering the cruise control based upon the sensor is stopped and a YES path 1124 is followed to the start block 1104. According to various embodiments, if a sensor error is determined an indication may be provided to the rider 200, such as with the display device 160. Further, additional warning indicators or error indicators may be provided to the rider 200 such as with selected LED's or warning lights. Nevertheless, if errors are in the sensor assemblies, the YES path 1124 is followed so the cruise control is not altered by inputs from the assemblies.

If no error is found in the sensor assemblies, a NO path 1130 is followed. As discussed above, the rider 200 may operate the cruise control to turn the cruise control on to select a selected speed, such as select initial or set speed in block 1132. The set initial speed in block 1132 may be desired or selected by the rider 200, but may be augmented or changed by an intelligent or adaptive cruise control, as discussed herein, such as according to the flowchart 1100.

After receiving a set initial speed in block 1132, the method 1100 may confirm or reconfirm that the adaptive cruise control is on or selected in block 1133. If the adaptive cruise control is off, an OFF path 1133a may be followed to initiate the process 1100 again in start block 1104. If it is determined (such as confirming an input from the rider 200 for operation of the adaptive cruise control) that the adaptive cruise control is on, an ON path 1133*b* path may be followed to determine whether a set speed has been updated in block 1134. If the set speed has been updated or changed, a YES path 1134*a* may be followed such that the most recent set speed may be store in block 1135. If the set speed has not been updated a NO path 1134*b* or once the new set speed has been saved in block 1135, a path to recall target follow criteria in block 1137 is followed, as discussed herein.

The selected speed selected by the rider 200 may be a desired speed that is augmented by the flowchart 1100 to maintain or achieve selected following distances, such as the following distance 960, illustrated in FIG. 14, with the following distance 1000 illustrated in FIG. 15. Accordingly the cruise control adaptive system according to the flowchart 1100 may recall target following criteria A and B. The target following criteria A and B need not be absolute or discrete criteria, such as distances, but may include a range or have a tolerance. The following criteria A and B, as discussed further herein, may include length or physical distances such as measured in feet or meters. The following criteria or target criteria may also and/or alternatively include time(s) based upon distance and speed or relative speed between two objects, such as the first motorcycle 10 and the second motorcycle 880. Accordingly, as discussed above, the distance 960 between the first motorcycle 10 and the second motorcycle 880 may be a distance that could be traveled in a selected amount of time, such as about 1 second to about 3 seconds, including about 1 seconds, based upon the current or instantaneous speed of the motorcycle 10 relative to the object, such as the first motorcycle 880. The distance 910 between the first motorcycle 10 and the third motorcycle 884 may be a distance that could be traveled by the first motorcycle 10 at its instantaneous or current speed relative to the third motorcycle 884 in a time of about 2 seconds to about 6 seconds, including about 2 seconds.

Accordingly the distance that may be the following distance or target distances, e.g. the distances 960 and 901, may also be referred to or understood to be time or an amount of time required for the motorcycle 10, or other respective motorcycles, to travel the physical distance 960 or 901. For example, the distance 901 can be determined to be 2 seconds and if the motorcycle 10 is traveling at 70 mph the length or distance 901 would need to be about 200 feet to about 220 feet, including about 204 feet. It is understood, however, if the motorcycle 10 slowed to a slower rate of speed, such as about 35 mph, the distance 910 may be less but would still maintain the following distance or time of 2 seconds. Accordingly, as discussed further herein, the distance or time between two vehicles, such as the motorcycle 10 and the second motorcycle 880 and/or the third motorcycle 884 may be generally referred to as a criteria which may include a target following criteria. The target following criteria may include a length or length distance that is the distance 910 and/or 960 or a selected time that may be the target following criteria that would be based upon a speed of the motorcycle 10 relative to the other vehicles, including the second motorcycle 880 and the third motorcycle 884.

The target following criteria A may include the distance between the motorcycle 10 and the first motorcycle 880, or any motorcycle or object closest in the lane to the first motorcycle 10. The following criteria B may include the distance between the motorcycle 10 and the second motorcycle 884, or any vehicle or object that is directly in an intended path 900 of the first motorcycle 10. As discussed above, the motorcycle 10 may have an intended path that is a distance 901 from the third motorcycle 884 when the second motorcycle 880 is offset the distance 950 from the first motorcycle 10. In various situations, however, the second motorcycle 880 may move into the intended path of the first motorcycle 10, as illustrated in FIG. 15. The recalled target follow criteria in block 1137 may be stored on a selected memory system and recalled by a selected processor, within the flowchart 1100. As discussed herein, the target following criteria may include criteria that are used to calculate a specific distance or speed dynamically with the processor on and/or accessed with a system on the motorcycle 10.

The recall target criteria in block 1137 may also include recalling a selected or desired following time, as noted above, that may be based upon a relative speed of the motorcycle 10 to the objects or vehicles in front of the motorcycle 10 (e.g. the second motorcycle 880 and the third motorcycle 884) and/or the absolute (e.g. relative to ground) speed of the motorcycle 10. Accordingly, recalling the target criterial in block 1137 may include recalling a following time of 1 second to a nearest motorcycle, such as the second motorcycle 880, and a two second following time relative to a further motorcycle, such as the third motorcycle 884. Thus recalling criteria in block 1137 may include recalling a selected length distance, following time, or other appropriate criteria.

The processor assembly may also determine a lane in block 1140. The determination of the lane in block 1140 may be based upon various interpretation, and may only be optionally determined. For example, the camera 800 on the motorcycle 10 may be used to provide an indication of the lane markers 860 and 864. The first lane 870 may then be determined between the respective lane markers 860, 864. Nevertheless, determination of the selected vehicles and/or follow criteria may not be required in the flowchart 1100. Accordingly, determining the lane in block 1140 is not required, and may be selected only in various embodiments.

Further, the determined lane may be subdivided in block 1140 to determine lane partitions, as discussed above. For example, the ADC may determine segments or lane partitions, such as half or thirds of the determined lane, such as the first lane 870, or specific widths distances (e.g. 4 feet) within the lane 870. Generally, a lane may be determined as an area or distance between lane markers and/or a side of a road and lane makers. The system may then determine that a vehicle, such as the second motorcycle 880 should be at a selected following criteria, such as the target criteria A as long as the motorcycle 880 is within a portion of the lane, such as a half, that is not in the path of the first motorcycle 10. Thus, lane sub-division may be used to assist in determining a selected target following criteria relative to selected vehicles within the lane 870.

Following the optional determination of the lane in block 1140, a determination of whether a vehicle is detected or target vehicle is detected forward of the motorcycle 10 in block 1142. If no vehicle is detected in block 1142 (e.g. as with the radar sensor 350) a NO path 1152 may be followed to send cruise control "plus" (i.e. increase speed set amount) or "minus" (i.e. decrease speed a set amount) signals to achieve a selected speed in block 1156. The cruise control, if including the adaptive cruise control method 1100, may achieve the selected speed based upon the output from the flowchart 1100. Accordingly, if no more than one vehicle or if no vehicles are sensed or detected in front of the motorcycle 10, the output in block 1156 may include a selected plus or minus cruise control signal to achieve the determined speed and follow criteria relative to the single vehicle if detected or to just achieve the selected speed if no vehicle is detected. If no more than one or no vehicle is detected, following the signal sent from block 1156, the method may loop to the determination block 1133 of whether the adaptive cruise control is selected ON or OFF. The method may then continue from there, as discussed herein.

If a vehicle is detected, a YES path 1144 may be followed to determine if more than one vehicle is detected, particularly more than one vehicle is detected in block 1150 in the lane, then a YES path 1160 is followed to recall the target criteria and be in block 1162. The recalling of the target distances in block 1162 may be the same criteria recalled in block 1164, but may be recalled if more than one vehicle is detected. Accordingly, after detecting whether more than one vehicle is present in a lane, or at a selected position relative to the motorcycle 10, the process 1100 may make a determination of whether either of the more than one vehicles is offset from the motorcycle 10 in block 1170. As discussed above, in a staggered formation as illustrated in FIG. 14, at least one of the motorcycles, such as the second motorcycle 880, may be offset the distance 960 from the motorcycle 10.

If no motorcycle is determined to be offset, a NO path 1174 may be followed and an output or signal block 1176 may be followed to achieve or send a cruise control signal to achieve the target criteria B from the closest vehicle in block 1176. Similarly, if no second vehicle is detected a NO path 1177 may be followed from the determination block 1150 to the send signal block 1176. After sending the cruise control signal in block 1176, a loop path 1204 may be followed to restart the method 1100 in start block 1104 and/or to the determination block 1133 to determine whether the adaptive cruise control is selected to be ON or OFF. Based on the selection, the method 1100 may continue form there as discussed herein.

As illustrated in FIG. 15, even if more than one vehicle is detected the target follow criteria may achieve or be selected relative to the closest vehicle, such as the second motorcycle 880, to maintain or achieve the criteria 1000. Again the achievement of the selected distance 1000, which may be the same as the distance 901 illustrated in FIG. 14, may be made and the system may continue to receive inputs regarding whether there is more than one vehicle in the lane in block 1150 and to further determine whether the vehicles are offset in block 1170. Further, the lean angle of the motorcycle 10 may be used to assist in determining whether the motorcycle 10 is in a turn or curve and, if so, switch from determining whether a second vehicle is to be detected to a single. As noted above, a staggered motorcycle riding formation generally moves to a single file in a curve. A lean angle above a selected amount, e.g. about 10 degrees in a selected direction, may be determined to be a turn in the selected direction.

If it is determined that the vehicles are offset in block 1170, a YES path 1180 is followed to a dual determination block 1190 to measure the following distance from the first vehicle 880, which may be the target criteria A and to measure the distance from the second vehicle 884 which may be the target criteria B. Again, it is understood, that the first and second motorcycles 880, 884 and their respective target criteria are merely exemplary for the current discussion and the illustration of the flowchart 1100. Nevertheless, once the respective criteria from the first motorcycle and the second motorcycle 880, 884 are measured they may be compared to the target criteria A and target criteria B. Therefore, the measured criteria from block 1190 may be input to a determination block 1194 to determine whether the first vehicle or motorcycle 880 is closer than the target criteria in block 1194. If the first vehicle, such as the first motorcycle 880, is closer than the target criteria A then a YES path 1196 may be followed to send a cruise control minus command in block 1200. The cruise control minus command may be to slow or send a minus signal to the cruise control system at a selected amount, such as lower speed by 1 mph, 2 mph or any appropriate speed reduction. The change in speed may be due to changing an engine speed, such as with the ECU 272. Further, or in addition thereto, the cruise control minus signal may be provided as a feedback to the rider 200 (such as an indication on the panel 150) to slow to achieve a preselected target criteria and the engine 40 is not changed. The sending of the cruise control minus signal in block 1200 may be any appropriate number of minus signal to achieve the selected target criteria A.

If the first vehicle is not closer than the target distance A, then a NO path 1208 may be followed from the determination block 1194 to a determination block 1214 to determine whether the second vehicle, such as the third motorcycle 884, is closer than the target distance B in block 1214. Similarly, after sending of the cruise control minus signal in block 1200 the method may continue to the determination block 1214. If the second vehicle, such as the third motorcycle 884 is closer than the target criteria B, then a YES path 1220 may be followed to send a minus cruise control in block 1221 until the target criteria B is achieved, in a manner as discussed above. Following sending the cruise minus in block 1221, the method 1100 may follow the loop 1204 to the determination block 1133. The method 1100 may then proceed as discussed herein.

If the second car or vehicle is not closer than the target distance B, a NO path 1228 may be followed to a determination block 1229 to determine whether the current speed is greater than the set speed. The determination may be made by comparing (such as by executing instructions with a processor in the ECU) the determined current speed and the set speed in block 1132 or 1135. If the current speed is determined to be greater than the set speed, a YES path 1229*a* is followed to a send cruise control minus signal to achieve the set speed in block 1230. Once the cruise control signal is sent, the method may then proceed along path 1204 and loop to the determination block 1133, as discussed herein.

If the determination in block 1229 is that the current speed is less than (e.g. not greater than) the set speed, a NO path 1229*b* may be followed to a determination block 1232 of whether the second motorcycle 880 or the third motorcycle 884 are at the respective target criteria A and B. If the second and third motorcycles 880, 884 are at the respective criteria A and B, a YES path 1236 may be followed to a maintain speed block 1238. The maintain speed block 1238 may not send either a plus or a minus cruise control signal and the loop 1204 may be followed to the determination block 1133, and the method 1100 may proceed as discussed herein.

If, however, the target criteria between the motorcycle 10 and either of the second motorcycle 880 or the third motorcycle 884 is not achieved or is less than the target criteria (e.g. shorter distance or less time), a NO path 1242 may be followed. The NO path 1242 may go to a determination block 1243 to first determine is the set initial speed (i.e. block 1132) is met.

If the current speed is at or less than the set initial speed a YES path 1244 path may be followed to send a cruise control plus signal in block 1246. The cruise control plus signal may be an appropriate signal that is to increase the speed of the motorcycle 10 to the set speed that has been recalled from block 1132 or block 1135. Following the send cruise control plus signal in block 1246, the loop process 1204 may be entered to return to block 1133 and the method 1100 may proceed from there, as discussed herein.

If the current speed is determined to not be less than (i.e. greater than) the initial set speed 1132 or the save speed in block 1135 then a NO path 1245 may be followed to send a cruise control minus command and/or a cruise control maintain speed in block 1238 to slow or maintain the speed of the motorcycle 10. Once the appropriate signal has been sent to the adaptive cruise control system, the method 1100 may enter the loop process 1204 from the block 1238 to block 1133, as discussed herein.

As discussed above, if the motorcycle 10 is too close to any of the respective vehicles, such as the second motorcycle 880 or the third motorcycle 884, the flowchart 1100 may cause a cruise control minus command in block 1200, 1230. Accordingly, the cruise control plus command in block 1246 may only be sent when it is determined that the motorcycle 10 is too far (e.g. a distance or time greater than a selected target criteria) from the forward motorcycles, also referred to as the targeted or system identified forward motorcycles.

Again, the send cruise control plus signal may include providing an indication, such as a visual indication on the panel 150 and/or display 160, to the rider 200 to increase speed to achieve a preselected (i.e. target) distance. The signal may also be a selected signal that automatically increases the speed of the motorcycle 10, such as sent to the ECU to operate the throttle control. After sending the cruise command plus command in block 1246, however, the loop path may be followed to initiate the method again at start 1104.

In the motorcycle 10, as discussed above, a plurality of the sensors, such as the sensor 350 and the sensor 250 are may be included. It is understood, however, that additional sensors may be provided to acquire additional environmental information relative to the motorcycle 10. For example, two or more radar assemblies may be directed at relative angles to the long axis 101 of the motorcycle 10. The additional radar assemblies, or selected sensor assemblies, may provide additional or redundant information regarding positions, speed, etc. of objects in an environment (e.g. external) of the motorcycle 10.

Accordingly, the motorcycle 10 may include the intelligent or adaptive cruise control method or process illustrated in 1100 to achieve the target follow criteria between the motorcycle 10 and vehicles, such as respective motorcycles including the second motorcycle 880, and the third motorcycle 884 that are forward of the first motorcycle 10.

The various send cruise control signals may include sending an indication to the rider 200 to slow or increase speed. Such indications may include visual indications with the display 160 and/or lights. Further, the haptic feedback system 450 may provide further indications. Also, the ADC may further have included limitations where an automatic slowing of the motorcycle may occur to a selected speed when the motorcycle 10 is in a selected gear, but an indication is given to the rider 200 when a slower speed is needed, but the motorcycle is in too high a gear. For example, the ADC in method 1100 has determined that the motorcycle 10 should slow to less than 20 mph, but the motorcycle is in 4th gear. In such an instance, an indication may be sent to the rider 200 to manually shift and slow the motorcycle 10 rather than the ADC automatically slowing the motorcycle such as with slowing the engine.

FIGS. 16A and 16B illustrate a process or method 1100 for an adaptive cruise control system to control the speed of a motorcycle 10, according to various embodiments. The cruise control or adaptive cruise control of the process 1100 illustrated in FIGS. 16A and 16B, may be augmented or adapted to include a cut-out or pre-loop sequence 1300 illustrated in FIG. 17. For example, the method 1300 may be inserted or read out from memory, wherein the method is encoded as instructions to be executed by a selected processor, in the loop 1204 prior to executing block 1133. It is understood, however, that the process 1300 may also be a separate process that is independent of the method 1100.

In the selected process 1300, it may be optionally selected to perform an additional determination or consideration prior to sending a speed increase or a cruise control plus signal to the cruise control system for the motorcycle 10 to increase the speed of the motorcycle 10. As illustrated in FIG. 16A, if a cruise plus or increase cruise speed signal is sent, such as from block 1246, the signal may enter the selective loop or determination 1300, as illustrated in FIG. 17. The process 1300, therefore, is operable to determine whether the motorcycle is cornering at speed or is already at a lean angle at or above a threshold in block 1310. For example the IMU 650 and/or lean angle sensors 600 may provide input or signals that may be used to determine whether the motorcycle is leaning for a turn or in a curve. In addition, as discussed above, various lean angle systems may be used to assist and determine the lean angle of the motorcycle 10. If the motorcycle is leaning at a an angle greater than a selected threshold, such as about greater than 10 degrees from vertical relative to a road surface, the motorcycle's 10 cruise control system may be used to determine that the motorcycle 10 is leaning or in a curve. Further, an amount of handle bar turn and/or determined angle from the lean determination systems (e.g. IMU 650 or sensors 600) may be used to determine that the motorcycle 10 is leaned and/or in a curve. Also, it may be determined to further access the speed of the motorcycle 10 while leaning. For example, if the speed is greater than about 5 mph it may be determined that the motorcycle is at a selected speed or above a selected threshold speed for turning or in a curve.

If it is determined that the motorcycle is cornering or in a turn at a selected speed, a YES path 1314 may be followed and the increase speed or cruise control plus signal is not sent (e.g. blocked to terminated) to the cruise control in block 1320. By not sending the increase speed signal to the cruise control in block 1320, the speed of the motorcycle 10 may be maintained or selected manually by the rider 200. This may assist in ensuring that the speed of the motorcycle is maintained at a selected speed in a curve. It may also be used to ensure that a change speed of any type is not sent to the cruise control, such that a selected speed is maintained to assist in maintaining balance and control of the motorcycle 10 during the cornering or leaning procedure.

For example, while operating the motorcycle 10, the rider 200 may selected to corner a selected curve at a selected speed. If the motorcycle is in a curve, however, and the adaptive cruise control process 1100 determines that the motorcycle should increase or decrease in speed, the rider 200, while cornering, may not desire or select to have the speed of the motorcycle change. Therefore, the adaptive cruise control 1100 may apply the optional process 1300 to maintain the speed of the motorcycle 10 at the speed, such as manually, by the rider 200.

If it is determined that the motorcycle is not leaning and/or cornering in block 1310, a NO path 1330 may be followed. If the No path 1330 is followed, the send or transmit command to change the speed to the adaptive cruise control may be made in block 1334. Accordingly, if it is determined that the motorcycle is not leaned at or above a selected threshold angle and/or not cornering, the change of speed command may be sent to the cruise control as discussed above, such as in the process 1100.

Accordingly, the selected lean and/or cornering process 1300 may be used to assist in achieving a selected stability of the motorcycle 10 while cornering and/or leaning. The optional process 1300, therefore, may be used to ensure that the motorcycle 10 is maintained in a stable and selected speed during a turn and/or maneuvering a curve and achieve stability and confidence in the motorcycle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

What is claimed is:

1. A method of operating a wheeled powered vehicle assembly having two or three wheels and having an automatic speed control system, comprising:
   determining a probable path of the wheeled powered vehicle based at least in part on a sensed condition;
   sensing, with a sensor, an object in an environment exterior to the wheeled powered vehicle assembly;
   transmitting a sense signal regarding the object to a processor system;
   recalling a target distance;
   executing instructions with the processor system to determine if the target distance is present between the wheeled powered vehicle assembly and the object; and
   if the target distance is not present, automatically altering a speed of the wheeled powered vehicle assembly to achieve the target distance.

2. The method of claim 1, further comprising:
   receiving a selected speed input from a rider of the wheeled powered vehicle assembly;
   controlling a powerplant of the wheeled powered vehicle assembly to achieve the selected speed.

3. The method of claim 2, further comprising:
   recalling the target distance and/or a target following criteria from a memory;
   wherein the object is a wheeled powered vehicle assembly having two or three wheels.

4. The method of claim 3, further comprising:
   executing instructions with the processor system to either (i) transmit a speed plus signal if the object is at a criteria greater than the target distance and/or the target following criteria or (ii) transmit a speed minus signal if the object is at a criteria less than the target distance and/or the target following criteria.

5. The method of claim 3, wherein the target distance and/or the target following criteria includes a first following criteria and a second following criteria, wherein the second following criteria is greater than the first following criteria;
   wherein the object includes a first object and a second object;
   wherein the sensing, with a sensor, the object includes sensing both the first object and the second object;
   wherein the first following criteria relates to the first object and the second following criteria relates to the second object.

6. The method of claim 1, further comprising:
   determining if the first object is offset from the wheeled powered vehicle assembly based on the sensing of the first object; and
   sending a cruise control speed signal based on a determined distance to increase or decrease a speed of the wheeled powered vehicle.

7. The method of claim 5, further comprising:
   determining a first measured distance to the first object from the wheeled powered vehicle assembly;
   generating a first comparison comparing the first measured distance to the first following criteria; and
   outputting the first comparison.

8. The method of claim 7, further comprising:
   when the output of the first comparison is that the first measured distance is less than the first following criteria, transmitting the speed minus signal to slow the powerplant speed of the wheeled powered vehicle assembly.

9. The method of claim 7, further comprising:
   when the output of the first comparison is that the first measured distance is greater than the first following criteria, transmitting the speed plus signal to increase the powerplant speed of the wheeled powered vehicle assembly.

10. The method of claim 9, further comprising:
    determining if the second object is in an intended path the wheeled powered vehicle assembly based on the sensing of the second object.

11. The method of claim 10, further comprising:
    determining a second measured distance to the second object from the wheeled powered vehicle assembly;
    generating a second comparison of the second measured distance to the second following criteria; and
    outputting the second comparison.

12. The method of claim 11, further comprising:
    when the output of the second comparison is that the second measured distance is less than the second following criteria, transmitting the speed minus signal to slow the powerplant speed of the wheeled powered vehicle assembly.

13. The method of claim 11, further comprising:
    when the output of the second comparison is that the second measured distance is greater than the second following criteria, transmitting the speed plus signal to increase the powerplant speed of the wheeled powered vehicle assembly.

14. A method of operating a wheeled motorized vehicle assembly having two or three wheels and having an automatic speed control system, comprising:
  sensing, with a sensor, an object in an environment exterior to the wheeled motorized vehicle assembly;
  transmitting a sense signal regarding the object to a processor system;
  recalling a target distance;
  executing instructions with the processor system to determine if the target distance is present between the wheeled motorized vehicle assembly and the object; and
  if the target distance is not present, automatically altering a speed of the wheeled motorized vehicle assembly to achieve the target distance;
  determining if the first object is offset from the wheeled motorized vehicle assembly based on the sensing of the first object; and
  sending a cruise control speed signal based on a determined distance to increase or decrease a speed of the wheeled motorized vehicle;
  determining if the first object moves into the intended path of the wheeled motorized vehicle assembly;
  if the first object moves into the intended path of the wheeled motorized vehicle assembly, determining the that first object is the second object.

15. The method of claim 6, further comprising:
  determining a lean angle of the wheeled powered vehicle based on the sensed condition; and
  evaluating a probable path of the wheeled powered vehicle based at least in part of the determined lean angle;
  wherein sensing, with the sensor, the object includes receiving a reflected radar signal from the object and acquiring an image of a surface on which the wheeled powered vehicle assembly is intended to travel.

16. A method of operating a wheeled vehicle assembly having two or three wheels, a powerplant, and an automatic speed control system, comprising:
  measuring a first criterion from the wheeled vehicle assembly to a first object in an environment;
  measuring a second criterion from the wheeled vehicle assembly to a second object in the environment;
  executing instructions with the processor system to:
    determine a first intended path of the wheeled powered vehicle based at least in part on the measured first criterion;
    identify the first object as offset laterally an offset distance from the first intended path of the wheeled vehicle assembly;
    recall a first target criterion;
    determine a first difference between the recalled first target criterion and the first measured criterion;
    generate a first output based on the determined first difference;
    recall a second target criterion;
    determine a second difference between the recalled second target criterion and the second measured criterion; and
    generate a second output based on the determined second difference; and
    if the first difference or the second difference is different than a threshold amount, altering a speed of the powerplant of the wheeled vehicle assembly to at least achieve the threshold amount.

17. The method of claim 16, further comprising:
  executing instructions with the processor system for determining that the offset distance is a selected distance lateral of the first intended path of the wheeled vehicle assembly.

18. The method of claim 17, further comprising:
  receiving a selected speed input from the rider; and
  controlling the powerplant of the wheeled vehicle assembly to achieve the selected speed.

19. The method of claim 18, wherein altering the speed of the powerplant of the wheeled vehicle assembly includes executing instructions with the processor system for either (i) transmitting a speed plus signal or (ii) transmitting a speed minus signal.

20. The method of claim 19, wherein transmitting the speed minus signal occurs if either of the first difference or the second difference is determined to be smaller than a selected threshold.

21. The method of claim 19, wherein transmitting the speed plus signal occurs if either of the first difference or the second difference is determined to be greater than a selected threshold.

22. The method of claim 21, further comprising:
  stopping the transmission or execution of the speed plus signal if the wheeled powered vehicle is at a lean angle at or above a selected threshold.

23. A method of operating a wheeled motorized vehicle assembly having two or three wheels and having an automatic speed control system, comprising:
  measuring a first criterion from the wheeled motorized vehicle assembly to a first object in an environment;
  measuring a second criterion from the wheeled motorized vehicle assembly to a second object in the environment;
  receiving a selected speed input from the rider;
  controlling a motor of the wheeled motorized vehicle assembly to achieve the selected speed;
  executing instructions with the processor system for:
    identifying the first object as offset laterally an offset distance from a first intended path of the wheeled motorized vehicle assembly;
    recalling a first target criterion;
    determining a first difference between the recalled first target criterion and the first measured criterion;
    generating a first output based on the determined first difference;
    recalling a second target criterion;
    determining a second difference between the recalled second target criterion and the second measured criterion; and
    generating a second output based on the determined second difference;
    if the first difference or the second difference is different than a threshold amount, altering a speed of the motor of the wheeled motorized vehicle assembly;
    determining that the offset distance is a selected distance lateral of the first intended path of the wheeled motorized vehicle assembly;
  wherein altering the speed of the motor of the wheeled motorized vehicle assembly includes executing instructions with the processor system for either (i) transmitting a speed plus signal or (ii) transmitting a speed minus signal; and
  determining that the first object moves into the first intended path of the wheeled motorized vehicle assembly;
  changing an identification of the first object to a new second object.

24. The method of claim 16, further comprising:
acquiring an image of a surface on which the wheeled vehicle assembly is traveling;
executing instructions with the processor system for determining partitions of the surface based on the acquired image of the surface;
wherein identifying the first object as offset from the first intended path of the wheeled vehicle assembly includes determining that the first object is traveling in a lane partition of a single lane different than the wheeled vehicle assembly.

25. A wheeled powered vehicle assembly having two or three wheels, comprising:
a frame assembly having a front portion and a rear portion;
a first wheel assembly rotatably mounted to the frame assembly to support the frame assembly near the front portion;
a second wheel assembly rotatably mounted to the frame assembly to support the frame assembly near the rear portion;
an engine supported by the frame assembly and configured to drive the at least one of the first wheel assembly or the second wheel assembly;
a first sensor mounted to the frame assembly configured to sense an environment exterior to the frame assembly to collect information regarding the environment in a first manner and generate a first sense signal;
a second sensor configured to sense a condition of the frame assembly and generate a second sense signal;
a cruise control system configured to receive an input rider selected speed via an input and selectively maintain the wheeled powered vehicle assembly at the rider selected speed;
a processor system configured to:
execute instructions, based on the first sense signal, to determine a presence of an object at least in an intended path of the wheeled powered vehicle assembly;
execute instructions, based on the second sense signal, to determine a probable intended path of the wheeled powered vehicle assembly;
if the presence of an object is determined, (i) recall a selected parameter relative to the object and (ii) generate a plus signal or a minus signal to alter a current speed of the wheeled powered vehicle assembly;
wherein the cruise control system is operable to receive the generated plus signal or minus signal to alter the current speed of the wheeled powered vehicle assembly from the rider selected speed and attempt to achieve the recalled selected parameter.

26. The wheeled powered vehicle assembly of claim 25, wherein the first sensor includes a radar assembly.

27. The wheeled powered vehicle assembly of claim 25, further comprising:
a third sensor configured to sense the environment in a second manner and generate a third sense signal;
wherein the processor system is further configured to:
execute instructions, based on both the first sense signal and the third sense signal, to determine a presence of an object at least in an intended path of the wheeled powered vehicle assembly.

28. The wheeled powered vehicle assembly of claim 27, wherein the first sensor is a radar sensor assembly and the third sensor is a camera;
wherein the radar assembly is operable to identify an exterior object relative to the frame assembly in the environment;
wherein the camera is operable to acquire an image of a surface exterior to the frame assembly;
wherein the wherein the processor system is further configured to execute instructions, based on both the first sense signal and the third sense signal, to determine a partition of a lane of travel of the wheeled powered vehicle assembly, a partition in which the wheeled powered vehicle assembly is traveling, and the presence of the object in the lane of travel.

29. The wheeled powered vehicle assembly of claim 28, wherein the processor system is further configured to execute instructions to determine, at least based on one of the first sense signal or third sense signal, when the object moves into the partition of the lane of the wheeled powered vehicle assembly;
wherein the processor assembly generates the plus signal or the minus signal to alter the speed of the wheeled powered vehicle assembly when the processor system determines that the object has moved into the partition of the lane of the wheeled powered vehicle assembly;
wherein the speed of the wheeled powered vehicle assembly is altered automatically based on the generated plus signal or the minus signal.

* * * * *